United States Patent
Mathew et al.

(10) Patent No.: US 11,861,853 B1
(45) Date of Patent: Jan. 2, 2024

(54) SYSTEM AND METHOD OF VEHICLE SPEED ESTIMATION USING MOVING CAMERA AND TIME SERIES NEURAL NETWORK

(71) Applicant: ELM, Riyadh (SA)

(72) Inventors: Athul Mathew, Riyadh (SA); Thariq Khalid, Riyadh (SA); Riad Souissi, Riyadh (SA)

(73) Assignee: ELM, Riyadh (SA)

(*) Notice: Subject to any disclaimer, the term of this patent is extended or adjusted under 35 U.S.C. 154(b) by 0 days.

(21) Appl. No.: 18/328,441

(22) Filed: Jun. 2, 2023

Related U.S. Application Data

(60) Provisional application No. 63/426,211, filed on Nov. 17, 2022.

(51) Int. Cl.
   G06T 7/00 (2017.01)
   G06T 7/246 (2017.01)

(52) U.S. Cl.
   CPC .... *G06T 7/246* (2017.01); *G06T 2207/10016* (2013.01); *G06T 2207/10024* (2013.01); *G06T 2207/20084* (2013.01); *G06T 2207/30256* (2013.01)

(58) Field of Classification Search
   CPC .. G06V 20/588; G06V 10/82; G06T 2200/08; G06T 2207/30256; G06T 7/73
   See application file for complete search history.

(56) References Cited

U.S. PATENT DOCUMENTS

| | | |
|---|---|---|
| 11,608,083 B2 * | 3/2023 | Nakhaei Sarvedani ............... G06N 3/047 |
| 2018/0024562 A1 * | 1/2018 | Bellaiche .................. G06T 7/74 701/26 |
| 2019/0244366 A1 | 8/2019 | Yu et al. |
| 2020/0324794 A1 * | 10/2020 | Ma .................. B60W 60/00272 |
| 2021/0278852 A1 | 9/2021 | Urtasun et al. |

(Continued)

OTHER PUBLICATIONS

Bandari, Hitesh Linganna, and Binoy B. Nair. "An End to End Learning based Ego Vehicle Speed Estimation System." 2021 IEEE International Power and Renewable Energy Conference (IPRECON). IEEE, 2021.*

(Continued)

*Primary Examiner* — Li Liu
(74) *Attorney, Agent, or Firm* — Oblon, McClelland, Maier & Neustadt, L.L.P.

(57) ABSTRACT

A system, apparatus and method of embedded ego vehicle speed estimation apparatus, including a car-mounted monocular camera for capturing a sequence of video frames of an outdoor scene from a moving car, where the outdoor scene includes a road, as a camera channel, and processing circuitry. The processing circuitry is configured with a single-shot network and a 3D convolutional neural network (3D-CNN), the single-shot network segments features of the road in the video frame sequence and generates a masked-attention map for the segmented road features, a concatenation circuit concatenates the masked-attention map as an additional channel to the camera channel to generate a masked-attention input, and the 3D-CNN network receives the masked-attention input and generates an estimated speed of the ego vehicle based on displacement of the segmented road features in the video sequences.

20 Claims, 17 Drawing Sheets

(56) References Cited

U.S. PATENT DOCUMENTS

2022/0292291 A1 9/2022 Berman et al.

OTHER PUBLICATIONS

Yeon, Kyuhwan, et al. "Ego-vehicle speed prediction using a long short-term memory based recurrent neural network." International Journal of Automotive Technology 20 (2019): 713-722.*
Zhao, Baigan, et al. "Ego-motion estimation using recurrent convolutional neural networks through optical flow learning." Electronics 10.3 (2021): 222.*
Wu, Chao-Yuan, et al. "Long-term feature banks for detailed video understanding." Proceedings of the IEEE/CVF Conference on Computer Vision and Pattern Recognition. 2019.*
Hayakawa, Jun, and Behzad Dariush. "Ego-motion and surrounding vehicle state estimation using a monocular camera." 2019 IEEE Intelligent Vehicles Symposium (IV). IEEE, 2019.*
Athul M. Mathew, et al., "Ego Vehicle Speed Estimation Using 3D Convolution With Masked Attention", Computer Science > Computer Vision and Pattern Recognition (cs.CV), arXiv:2212.05432v1 [cs.CV] Dec. 11, 2022, Dec. 13, 2022, pp. 1-13.
Yi Zhou, et al., "Towards Deep Radar Perception for Autonomous Driving: Datasets, Methods, and Challenges", SENSORS, vol. 22, Issue 11, May 31, 2022, pp. 1-45.
Du Tran, et al., "Learning Spatiotemporal Features with 3D Convolutional Networks", IEEE International Conference On Computer Vision, Dec. 7-13, 2015, pp. 4489-4497.

* cited by examiner

SYSTEM AND METHOD OF VEHICLE SPEED ESTIMATION USING MOVING CAMERA AND TIME SERIES NEURAL NETWORK

CROSS-REFERENCE TO RELATED APPLICATIONS

This application claims the benefit of priority to provisional application No. 63/426,211 filed Nov. 17, 2022, the entire contents of which are incorporated herein by reference.

This application is related to provisional application No. 63/397,049 filed Aug. 18, 2022, the entire contents of which are incorporated herein by reference.

This application is related to Attorney Docket No. 544445US titled "System and method to detect Tailgating Vehicle on high speed road from a moving vehicle", U.S. application Ser. No. 18/173,126 having a filing date of Feb. 23, 2023, the entire contents of which are incorporated herein by reference.

STATEMENT REGARDING PRIOR DISCLOSURE BY THE INVENTORS

Aspects of this technology are described in Mathew, Athul M., Thariq Khalid, and Riad souissi, "3DCMA: 3D Convolution with Masked Attention for Ego Vehicle Speed Estimation," *Secure and Safe Autonomous Driving (SSAD) Workshop and Challenge*, Vancouver, Canada, Jun. 19, 2023, and preprint thereof, *arXiv preprint arXiv:*2212.05432 (2022), and is incorporated herein by reference in its entirety.

TECHNICAL FIELD

Background

The present disclosure is directed to a neural network time series model, and preferably, a 3D Convolutional Neural Network (3D-CNN). with masked-attention (3D-CMA) architecture to estimate ego vehicle speed using a single front-facing monocular camera.

DESCRIPTION OF RELATED ART

Speed estimation of an ego vehicle is crucial to enable autonomous driving and advanced driver assistance technologies. Due to functional and legacy issues, conventional methods depend on in-car sensors to extract vehicle speed through the Controller Area Network (CAN) bus.

The impact of electric vehicles today in contributing to an energy-efficient and sustainable world is immense. See Graeme Hill, Oliver Heidrich, Felix Creutzig, and Phil Blythe. The role of electric vehicles in near-term mitigation pathways and achieving the UK's carbon budget. *Applied Energy*, 251:113111, 2019. Electric vehicles are a significant influencing factor in the global push against climate change. To this end, self-driving vehicles add further value by enabling smart mobility, planning, and control for intelligent transportation systems. Predicting the ego vehicle speed reduces fuel consumption and optimizes cruise control. See Chao Sun, Xiaosong Hu, Scott J Moura, and Fengchun Sun. Velocity predictors for predictive energy management in hybrid electric vehicles. *IEEE Transactions on Control Systems Technology*, 23(3):1197-1204, 2014; and Thomas Stanger and Luigi del Re. A model predictive cooperative adaptive cruise control approach. In 2013 *American control conference,* pages 1374-1379. IEEE, 2013.

Early work estimated ego-motion using correspondence points detection, road region detection, moving object detection, and other derived features. See Koichiro Yamaguchi, Takeo Kato, and Yoshiki Ninomiya. Vehicle ego-motion estimation and moving object detection using a monocular camera. In 18th *International Conference on Pattern Recognition (ICPR '06),* volume 4, pages 610-613. IEEE, 2006, incorporated herein by reference in its entirety. Furthermore, 8-point algorithm and RANSAC have been applied to get the essential matrix of ego-motion. See Richard I Hartley. In defense of the eight-point algorithm. *IEEE Transactions on pattern analysis and machine intelligence,* 19(6):580-593, 1997; and Martin A Fischler and Robert C Bolles. Random sample consensus: a paradigm for model fitting with applications to image analysis and automated cartography. *Communications of the ACM,* 24(6):381-395, 1981, each incorporated herein by reference in their entirety. Recent work implemented an end-to-end CNN-LSTM network to estimate the speed of an ego vehicle, seeHitesh Linganna Bandari and Binoy B Nair. "An end to end learning based ego vehicle speed estimation system." In 2021 IEEE International Power and Renewable Energy Conference (IP-RECON), pages 1-8. IEEE, 2021, incorporated herein by reference in its entirety. The work performs evaluation on DBNet and comma.ai speed challenge dataset. See Yiping Chen, Jingkang Wang, Jonathan Li, Cewu Lu, Zhipeng Luo, Han Xue, and Cheng Wang. Lidar-video driving dataset: Learning driving policies effectively. In 2018 *IEEE/CVF Conference on Computer Vision and Pattern Recognition,* pages 5870-5878, 2018; and comma.ai speed challege. https://github.com/commaai/speedchallenge, 2018, incorporated herein by reference in their entirety. Other work has proposed speed estimation of vehicles from a CCTV point of view. See Hector Mejia, Esteban Palomo, Ezequiel López-Rubio, Israel Pineda, and Rigoberto Fonseca. Vehicle speed estimation using computer vision and evolutionary camera calibration. In *NeurIPS* 2021 *Workshop LatinX in AI,* 2021, incorporated herein by reference in its entirety. Most require camera calibration and fixed view so that the vehicles pass through certain lines or regions of interest.

FlowNet and PWC-Net are deep neural networks to estimate optical flow in videos. See Eddy Ilg, Nikolaus Mayer, Tonmoy Saikia, Margret Keuper, Alexey Dosovitskiy, and Thomas Brox. Flownet 2.0: Evolution of optical flow estimation with deep networks. In *Proceedings of the IEEE conference on computer vision and pattern recognition,* pages 2462-2470, 2017; and Deqing Sun, Xiaodong Yang, Ming-Yu Liu, and Jan Kautz. Pwc-net: Cnns for optical flow using pyramid, warping, and cost volume. In *Proceedings of the IEEE conference on computer vision and pattern recognition,* pages 8934-8943, 2018, incorporated herein by reference in their entirety. FlowNet or PWC-Net can be used to estimate the ego vehicle speed. See Róbert-Adrian Rill. Speed estimation evaluation on the kitti benchmark based on motion and monocular depth information. *arXiv preprint arXiv:* 1907.06989, 2019; and Jun Hayakawa and Behzad Dariush. Ego-motion and surrounding vehicle state estimation using a monocular camera. In 2019 *IEEE Intelligent Vehicles Symposium (IV),* pages 2550-2556. IEEE, 2019, incorporated herein by reference in their entirety. However, ego vehicle speed estimation is performed by further post-processing on the optical flow pixel velocity. No work demonstrates end-to-end architecture capability where the speed could be learned with differentiation of the loss function.

Accordingly it is one object of the present disclosure to provide a method and system for ego vehicle speed estimation that includes camera data video frames from a moving car, processed with a neural network time series model, in particular, 3D convolutional neural network (3D-CNN), that generates a masked-attention input which the 3D-CNN network uses to estimate a speed of the ego vehicle.

SUMMARY

An aspect of the present disclosure is a system for ego vehicle speed estimation. The system can include a car-mounted monocular camera for capturing a sequence of video frames of an outdoor scene from a moving car, where the outdoor scene includes a road, as a camera channel; processing circuitry configured with a single-shot network and a neural network time series model, the single-shot network segments features of the road in the video frame sequence and generates a masked-attention map for the segmented road features; a concatenation operation that concatenates the masked-attention map as an additional channel to the camera channel to generate a masked-attention input; the neural network time series model receives the masked-attention input and generates an estimated speed of the ego vehicle based on displacement of the segmented road features in the video sequences; and output circuitry to output a signal indicating the estimated speed.

A further aspect of the present disclosure is an embedded ego vehicle speed estimation apparatus. The apparatus can include processing circuitry configured with a single-shot network and a neural network time series model, the single-shot network segments features in a video frame sequence of a road and generates a masked-attention map for the segmented road features; a concatenation the neural network time seties model receives the masked-attention input and generates an estimated operation that concatenates the masked-attention map as an additional channel to a camera channel to generate a masked-attention input; speed of the ego vehicle based on displacement of the lane line segments in the video sequences; and output circuitry to output a signal indicating the estimated speed.

A further aspect of the present disclosure is a non-transitory computer readable storage medium storing computer instructions, which when executed by processing circuitry, perform a method of ego vehicle speed estimation. The method can include segmenting, by a single-shot network, features in a video frame sequence of a road and generates a masked-attention map for the segmented road features; concatenating, by a concatenation operation, the masked-attention map as an additional channel to a camera channel to generate a masked-attention input; receiving, by a neural network time series model, the masked-attention input and generating an estimated speed of the ego vehicle based on displacement of the lane line segments in the video sequences; and outputting a signal indicating the estimated speed.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
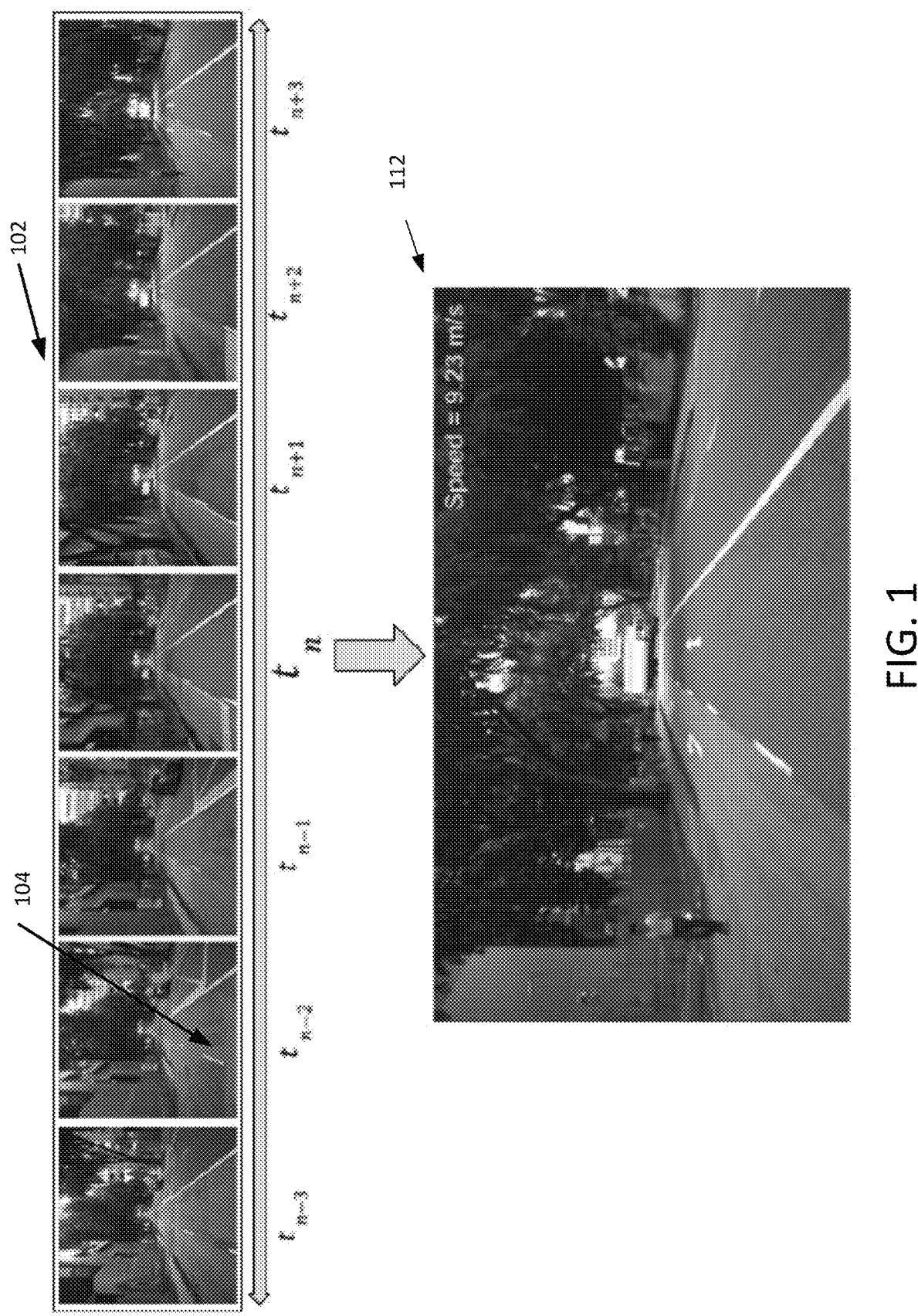
FIG. 1 illustrates estimation of ego-vehicle speed using a continuous camera stream.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure provides effective yet simple modular components for autonomous or intelligent traffic systems. Advanced Driver Assistance Systems (ADAS) are being made to improve automotive safety. Vehicles may offer driver assistance technologies including Autonomous Emergency Braking and a safe distance warning. ADAS may take into consideration environmental conditions and vehicle performance characteristics. Environmental conditions can be obtained using vehicle environment sensors. Vehicle cameras can capture a continuous camera stream. The term ego vehicle refers to a vehicle that contains vehicle environment sensors that perceive the environment around the vehicle. Edge computing devices are computing devices that are proximate to the data source, such as vehicle environment sensors.

FIG. 1 illustrates estimation of ego-vehicle speed using a continuous camera stream. The present disclosure includes a 3D Convolutional Neural Network (3D-CNN) architecture trained on short videos using corresponding grayscale image frames 102 and corresponding focus masks, such as masks that focus on road lane lines 104, lane line segmentation masks. The neural network architecture is used to estimate the speed 112 of the ego vehicle, which can, in turn help in ADAS, including, among other things, to estimate the speed of vehicles of interest (VOI) in the surrounding environment.

Figure 2:
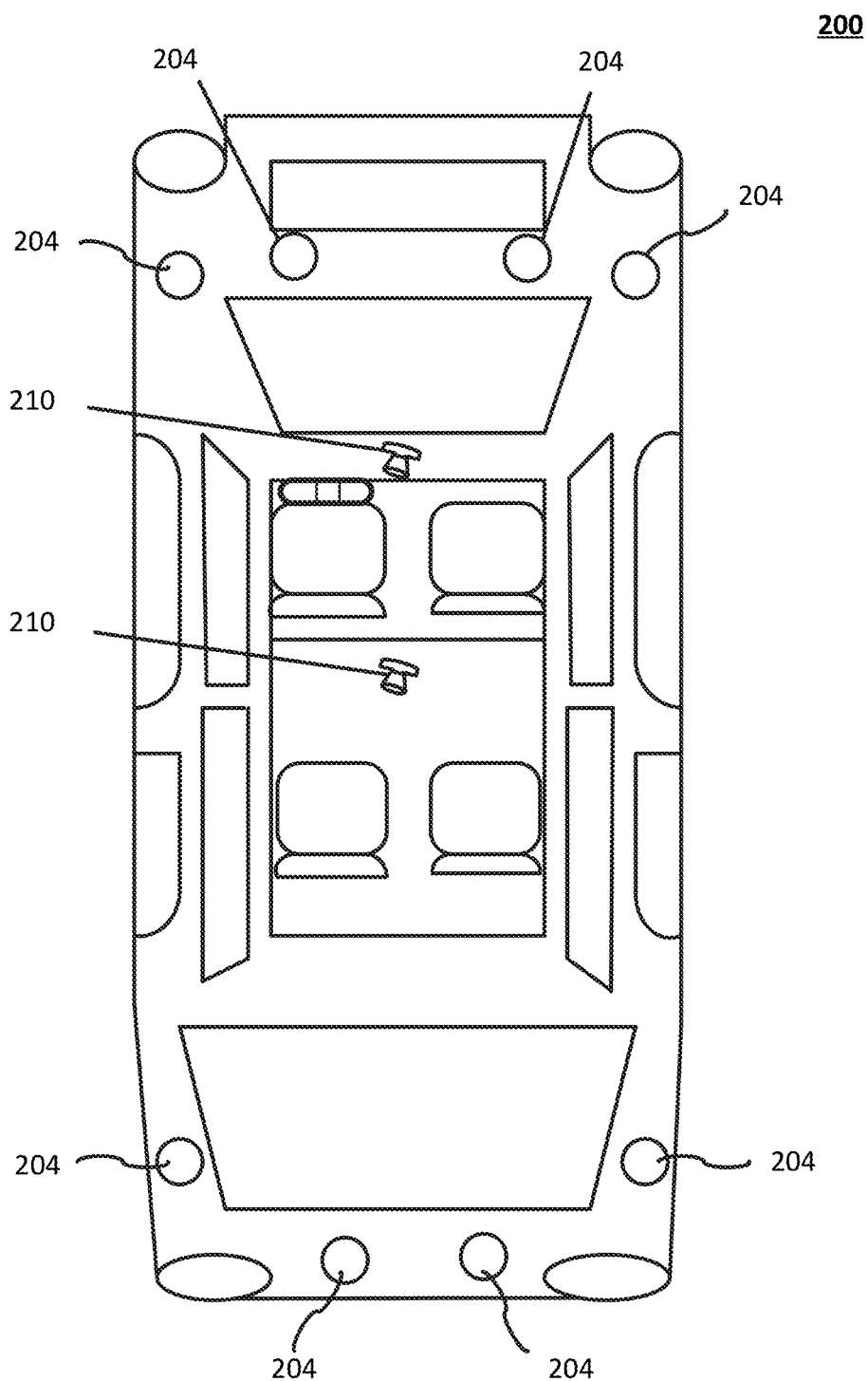
FIG. 2 is a top view of an exemplary vehicle having video cameras mounted thereon.

FIG. 2 is a top view of an exemplary ego vehicle having video cameras mounted thereon. Video cameras mounted on an ego vehicle may be used to obtain video images to be used to estimate the speed of the ego vehicle. The ego vehicle 200 can be of any make in the market. A non-limiting ego vehicle can be equipped with a number of exterior cameras 204 and interior cameras 210. One camera 214 for speed estimation can be mounted on the front dash, the front windshield, or embedded on the front portion of the exterior body and/or on the ego vehicle roof in order to capture images in front of the ego vehicle for external vehicles. The camera is preferably mounted integrally with a rearview/side mirror on the driver's side of the ego vehicle on a forward-facing surface (i.e., facing traffic preceding the ego vehicle). In this position the camera is generally oriented within the view of an individual inside the ego vehicle such that a driver can concurrently check for oncoming traffic behind the ego vehicle using the rearview side mirror and monitor the position of preceding vehicles.

Figure 3:
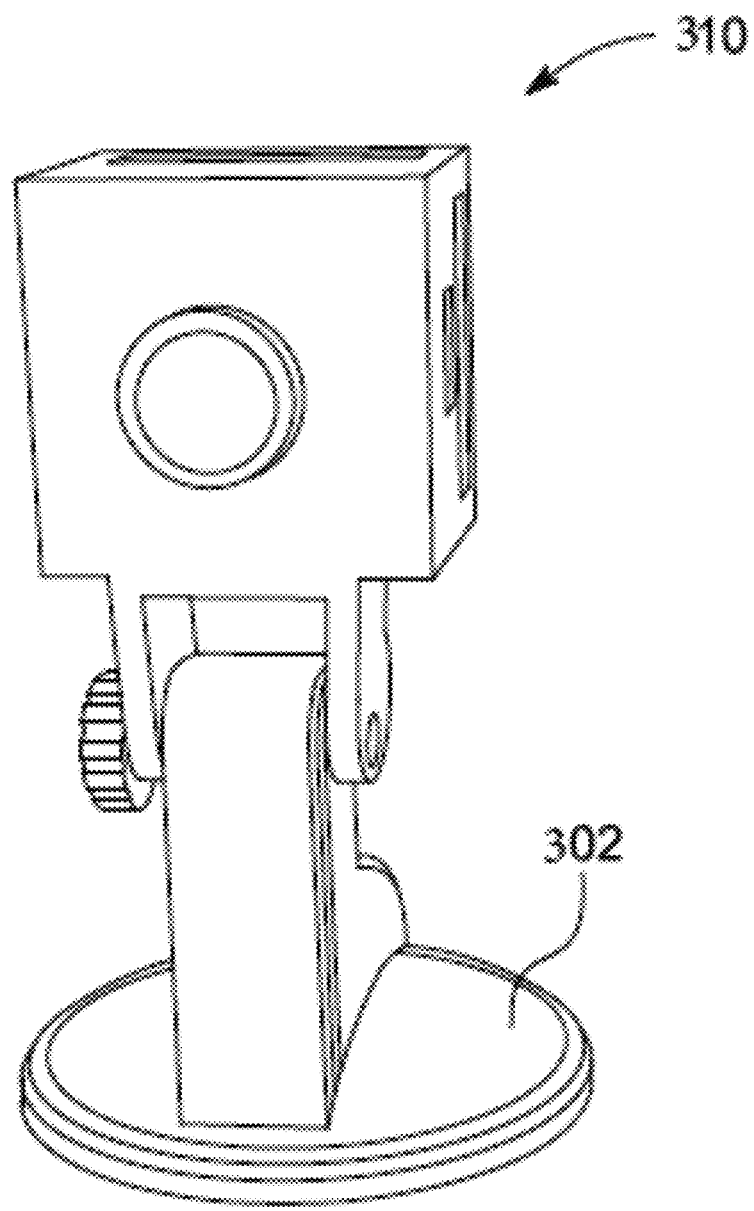
FIG. 3 illustrates an exemplary USB dashcam.

FIG. 3 illustrates an exemplary exterior-facing camera, which may be, but is not limited to, a USB camera 310 with a base that can be attached to the rearview mirror, side mirror, windshield, dashboard, front body panel, or roof of the ego vehicle 200, to name a few. The camera 310 can be a USB camera for connection to an edge computing device, that is proximate to the USB camera, by a USB cable. The USB camera 310 may be of any make which can channel a video stream. In one embodiment, the speed estimation apparatus is an all-in-one portable module that is removably mounted on a ego vehicle 200. Preferably the all-in-one portable module has a camera back plate which is curved to generally match the contours of the forward-facing surface of a side view mirror, e.g., an ovoidal shape having a flat inner surface matching the contours of the forward face of the side view mirror and a curved dome-like front surface with the camera lens/opening located at an apex of the dome shape. The back plate is optionally integral with a neck portion that terminates in a thin plate having a length of 5-20 cm which can be inserted into the gap between the window and patrol vehicle door to secure the all-in-one portable module to the ego vehicle. A cable and/or wireless capability may be included to transfer captured images to the edge computing device while the ego vehicle is moving.

The video camera 310 is capable of capturing a sequence of image frames at a predetermined frame rate. The frame rate may be fixed or may be adjusted in a manual setting, or may be set based on the mode of image capture. For example, a video camera may have an adjustable frame rate for image capture, or may automatically set a frame rate depending on the type of image capture. A burst image may be set for one predetermined frame rate, while video capture may be set for another predetermined frame rate.

In embodiments, ego vehicle speed is estimated based on video images of the surrounding environment. In some embodiments, the speed estimation is determined using machine learning technology. 2D Convolutional Neural Networks have proven to be excellent at extracting feature maps for images and are predominantly used for understanding the spatial aspects of images relevant to image classification and object detection. However, 2D Convolutional Neural Networks cannot capture the spatio-temporal features of videos spread across multiple continuous frames.

Neural network time series models can be configured for video classification. Neural network approaches that have been used for time series prediction include recurrent neural networks (RNN) and long short-term memory (LSTM) neural networks.

In addition, 3D Convolutional Neural Networks can learn spatio-temporal features and thus help in video classification, human action recognition, and sign language recognition. Attention on top of 3D-CNN has also been used. See Rohit Girdhar, Joao Carreira, Carl Doersch, and Andrew Zisserman. Video action transformer network. In Proceedings of the IEEE/CVF conference on computer vision and pattern recognition, pages 244-253, 2019; Chao-Yuan Wu, Christoph Feichtenhofer, Haoqi Fan, Kaiming He, Philipp Krahenbuhl, and Ross Girshick. Long-term feature banks for detailed video understanding. In *Proceedings of the IEEE/ CVF Conference on Computer Vision and Pattern Recognition,* pages 284-293, 2019; and Xiaolong Wang, Ross Girshick, Abhinav Gupta, and Kaiming He. Non-local neural networks. In *Proceedings of the IEEE conference on computer vision and pattern recognition,* pages 7794-7803, 2018, each incorporated herein by reference in their entirety. However, they are limited to action recognition use cases. Regression can also be performed using 3D-CNNs. See Agne Grinciunaite, Amogh Gudi, Emrah Tasli, and Marten den Uyl. Human pose estimation in space and time using 3d cnn. In *European Conference on Computer Vision,* pages 32-39. Springer, 2016; Xiaoming Deng, Shuo Yang, Yinda Zhang, Ping Tan, Liang Chang, and Hongan Wang. Hand3d: Hand pose estimation using 3d neural network. *arXiv preprint arXiv:* 1704.02224, 2017; and Liuhao Ge, Hui Liang, Junsong Yuan, and Daniel Thalmann. 3d convolutional neural networks for efficient and robust hand pose estimation from single depth images. In Proceedings of the *IEEE conference on computer vision and pattern recognition,* pages 1991-2000, 2017, each incorporated herein by reference in their entirety. However, the approaches perform regression perform spatial localization-related tasks such as human pose or 3D hand pose.

Vision Transformers (ViTs) capitalize on processes used in transformers in the field of Natural Language Processing. A non-overlapping takes patches of an image and creates token embeddings after performing linear projection. See Alexey Dosovitskiy, Lucas Beyer, Alexander Kolesnikov, Dirk Weissenborn, Xiaohua Thai, Thomas Unterthiner, Mostafa Dehghani, Matthias Minderer, Georg Heigold, Sylvain Gelly, et al. An image is worth 16x16 words: Transformers for image recognition at scale. *arXiv preprint arXiv:* 2010.11929, 2020, incorporated herein by reference in its entirety. These embeddings are concatenated with position embeddings, after which they are processed with the transformer block, which contains layer normalization, Multi-Head Attention, and MLP operations to produce a final classification output. ViTs have been used to replace CNNs, they lack the inductive bias, whereas CNN's are translation invariant due to the local neighborhood structure of the convolution kernels. Moreover, transformers have quadratic complexity for their operations and scale with the input dimensions. On the other hand, ViTs provide global attention and long-range interaction.

The inventors have determined that a hybrid CNN-Transformer with a CNN backbone, referred to as 3D-CNN with masked attention (3D-CMA) can outperform the pure ViT approach.

Video transformer architectures can be classified based on the embeddings (backbone and minimal embeddings), tokenization (patch tokenization, frame tokenization, clip tokenization), and positional embeddings.

In disclosed embodiments, the ego vehicle speed is estimated by relying purely on video streams from a monocular camera. The ego vehicle speed can be estimated by onboard hardware that implements a neural network time series model. In some embodiments, the ego vehicle speed is estimated using a hybrid CNN-Transformer (3D-CMA).

Figure 4:
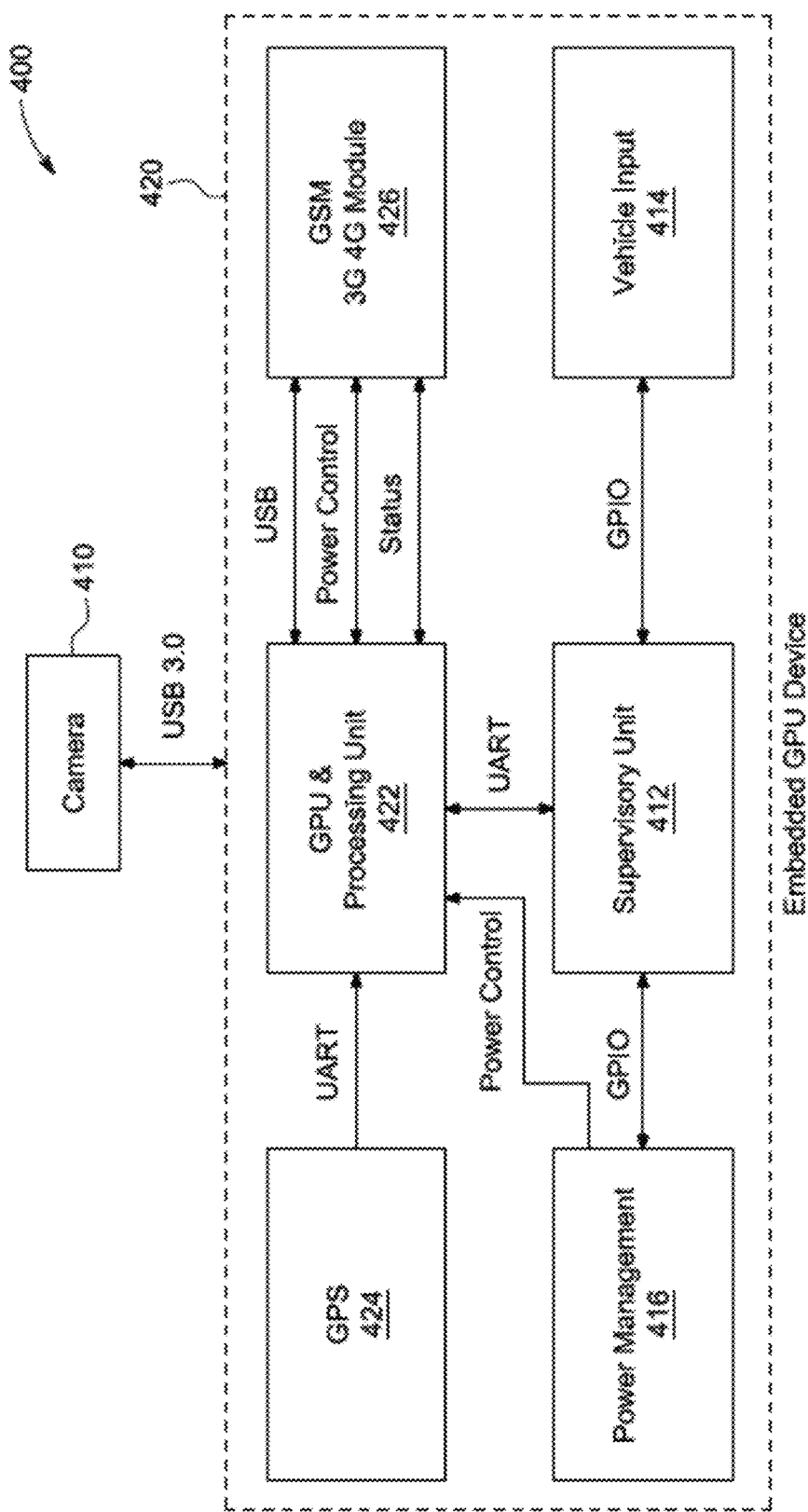
FIG. 4 is a block diagram of a hardware implementation of a tailgating detection system in accordance with an exemplary aspect of the disclosure.

FIG. 4 is a block diagram of an onboard hardware implementation of an ego vehicle speed estimation system in accordance with an exemplary aspect of the disclosure. The hardware implementation of the speed estimation system 400 includes an image/video capturing device (video camera 310) and an edge computing device 420. The video camera 310 is capable of capturing a sequence of image frames at a predetermined frame rate. The frame rate may be fixed or may be adjusted in a manual setting, or be set based on the mode of image capture. For example, a video camera may have an adjustable frame rate for image capture, or may automatically set a frame rate depending on the type of image capture. A burst image may be set for one predetermined frame rate, while video capture may be set for another predetermined frame rate.

The edge computing device 420 is configured as an embedded processing circuitry for ego vehicle speed estimation. In one embodiment, the edge computing device 420 is a portable, or removably mounted, computing device which is equipped with a Graphical Processing Unit (GPU) or a type of machine learning engine, as well as a general purpose central processing unit (CPU) 422, and its internal modules. The edge computing device 420 provides computing power that is sufficient for machine learning inferencing in real time for tasks including vehicle speed estimation and object detection, preferably all with a single monocular camera. Internal modules can include communication modules, such as Global System for Mobile Communication (GSM) 426 and Global Positioning System (GPS) 424, as well as an input interface 414 for connection to the vehicle network (Controller Area Network, CAN). A supervisory unit 412 may control input and output communication with the vehicle internal network. In one embodiment, the GPU/CPU configured edge computing device 420 is an NVIDIA Jetson Series (including Orin, Xavier, Tx2, Nano) system on module or an equivalent high-performance processing module from any other manufacturer like Intel, etc. The video camera 310 may be connected to the edge computing device 420 by a plug-in wired connection, such as USB, or may communicate with the edge computing device 420 by a wireless connection, such as Bluetooth Low Energy, depending on distance to the edge device and/or communication quality in a vehicle. This set up is powered by the vehicle's battery as a power source. A power management component 416 may control or regulate power to the GPU/CPU 422, on an as needed basis.

A time-series model must be utilized to capture the relative motion between adjacent image data samples.

As a basis, a 2D convolution operation over an image I using a kernel K of size m×n is:

$$S(i, j) = (I * K)(i, j) = \sum_m \sum_n I(i, j) K(i - m, j - n)$$

See Ian J. Goodfellow, Yoshua Bengio, and Aaron Courville. *Deep Learning*. MIT Press, Cambridge, MA, USA, 2016, which is incorporated herein by reference in its entirety.

Expanding further on the above equation, the 3D convolution operation can be expressed as:

$$S(h, i, j) = (I * K)(h, i, j) = \sum_l \sum_m \sum_n I(h, i, j) K(h - l, i - m, j - n)$$

where h is the additional dimension that includes the number of frames the kernel has to go through. In one embodiment, the kernel is convoluted with the concatenation of the grayscale images and lane line segmentation masks.

To this extent, a 3D-CNN network is incorporated to preserve the temporal information of the input signals and compute the ego vehicle speed. 3D-CNNs can learn spatial and temporal features simultaneously using 3D kernels. In one embodiment, small receptive fields of 3×3×3 are used as the convolutional kernels throughout the network. Many 3D-CNN architectures lose big chunks of temporal information after the first 3D pooling layer. This is especially valid in the case of short-term spatio-temporal features propagated by utilizing smaller temporal windows. The pooling kernel size is d×k×k, where d is the kernel temporal depth, and s is the spatial kernel size. In one embodiment, d=1 is used for the first max pooling layer to preserve the temporal information. In this embodiment, it can be ensured that the temporal information does not collapse entirely after the initial convolutional layers.

Figure 5:
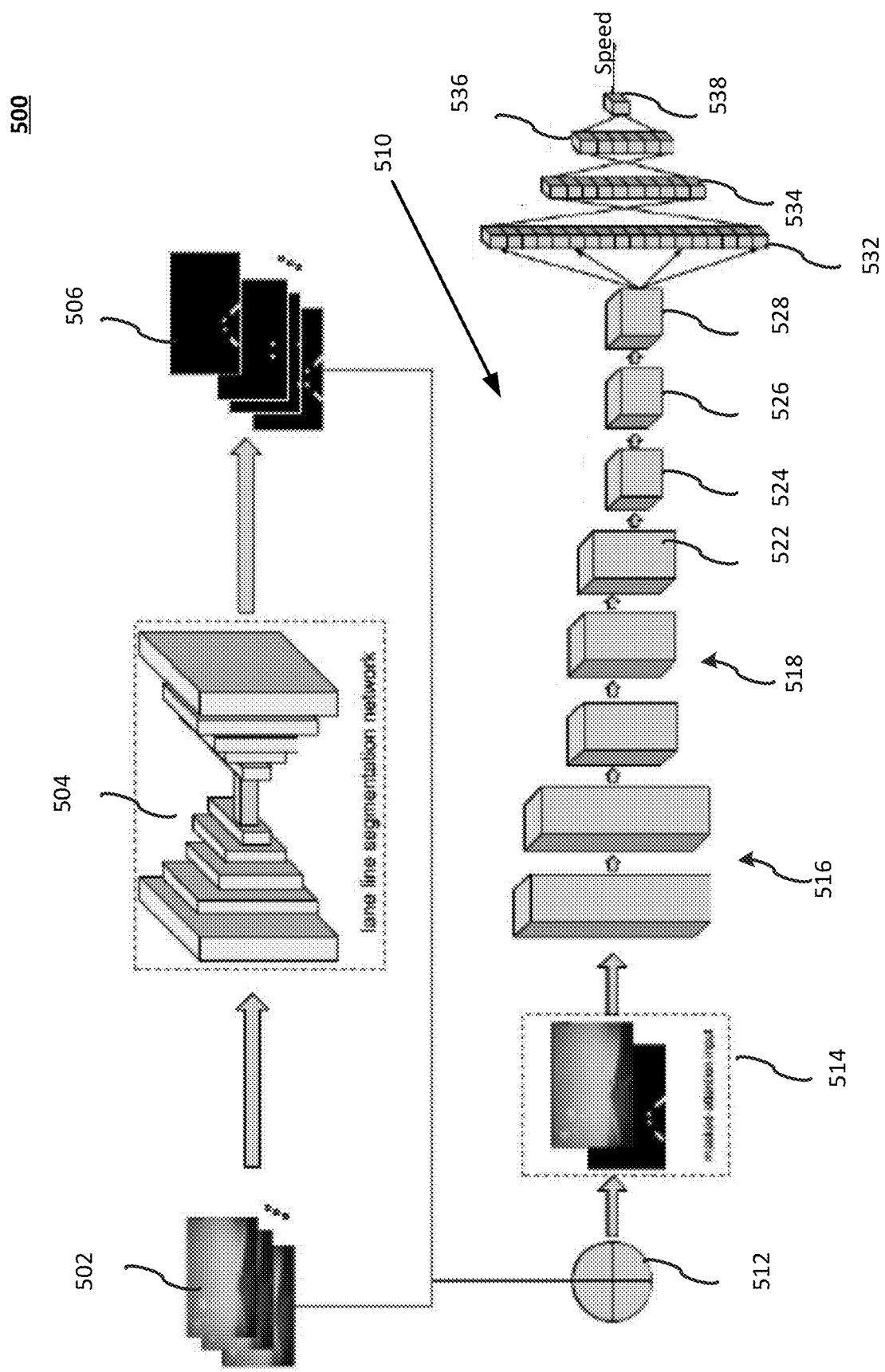
FIG. 5 is a block diagram of an architecture of 3D-CMA.
Figure 6:
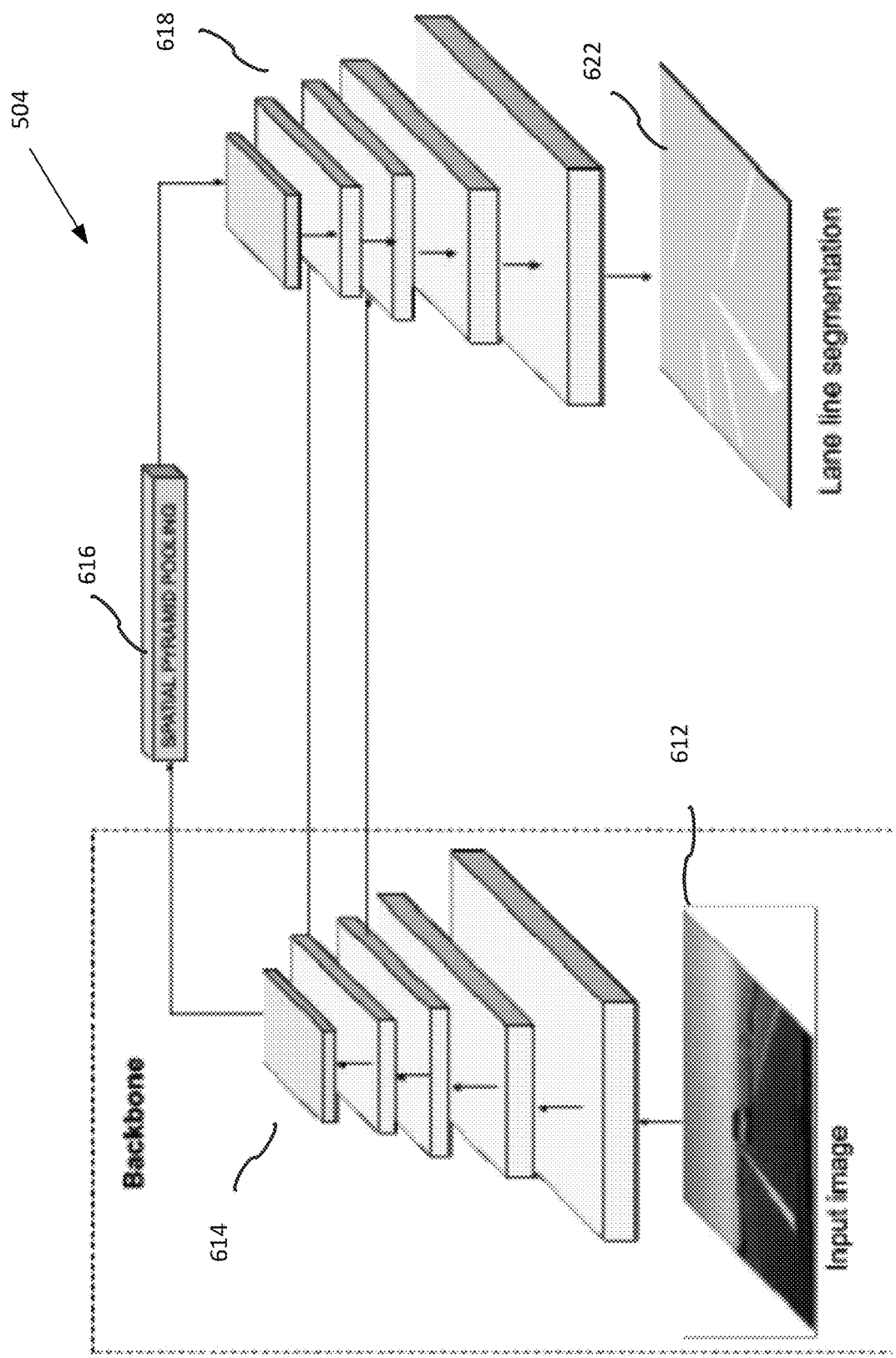
FIG. 6 is a block diagram of an architecture having lane line segmentation including an encoder and a decoder.

FIG. 5 is a block diagram of an architecture of 3D-CNN with masked attention (3D-CMA). FIG. 6 is a block diagram of an architecture having lane line segmentation including an encoder and a decoder as part of the masked attention layer. In some embodiments, a masked-attention layer 504 is added into the 3D-CNN architecture 500 to guide the model to focus on relevant features that help with ego-vehicle speed computation. In one embodiment, the relevant features are road lane lines.

An image of an outdoor scene captured from a moving car typically has significant clutter and random motion that can obscure the model learning. For example, a scene can be obstructed by other moving vehicles, moving pedestrians, or birds and other animals. Road work zones and temporary markers or lane markings may create unusual views of the road. In some cases, road markings may transition from temporary markings in work zones to regular lane line markings. Some roads may offer periodic mile markers.

A 3D-CNN model is preferably trained to filter out the irrelevant movements (such as that of other cars, pedestrians, etc.) that do not contribute towards the ego-vehicle speed estimation and focus only on features that matter. However, such a 3D-CNN model typically requires training with large quantities of data. In a more practical scenario where unlimited resources are not available, adding masked-attention helps to attain improved model performance with faster model convergence. As shown herein, the error in speed estimation is reduced by adding masked-attention to the 3D-CNN network 500. Further details about the impact of masked-attention are described as part of an ablation study below.

Convolutional neural networks comprise a learned set of filters, where each filter extracts a different feature from the image. An object is to inhibit or exhibit the activation of features based on the appearance of objects of interest in the images. Typical scenes captured by car-mounted imaging devices include background objects such as the sky, and other vehicles in the environment, which do not contribute to ego-vehicle speed estimation. In fact, the relative motion of environmental vehicles often contributes negatively to the ability of the neural network to inhibit irrelevant features.

To inhibit and exhibit features based on relevance, a masked-attention map 506 is concatenated to the input image 502 before passing an input image through the neural network. Regarding FIG. 6, a single-shot network 504 is used with a shared encoder 614 and three separate decoders that accomplish specific tasks such as object detection, drivable area segmentation, and lane line segmentation. Preferably, there are no complex and/or redundant shared blocks between different decoders, which reduces computational consumption. CSP-Darknet is preferably used as the backbone network 614 of the encoder, while the neck is mainly composed of Spatial Pyramid Pooling (SPP) module 616 and Feature Pyramid Network (FPN) module. See Chien-Yao Wang, Alexey Bochkovskiy, and Hong-Yuan Mark Liao. Scaled-yolov4: Scaling cross stage partial network, 2020; Kaiming He, Xiangyu Zhang, Shaoqing Ren, and Jian Sun. Spatial pyramid pooling in deep convolutional networks for visual recognition. In *Computer Vision—ECCV 2014*, pages 346-361. Springer International Publishing, 2014; and Tsung-Yi Lin, Piotr Dollár, Ross Girshick, Kaiming He, Bharath Hariharan, and Serge Belongie. Feature pyramid networks for object detection, 2016, each incorporated herein by reference in their entirety. SPP generates and fuses features of different scales, and FPN fuses features at different semantic levels, making the generated features contain multiple scales and semantic level information.

In one embodiment, the masked-attention map 506 is generated from input video sequences 502 using the lane line segmentation branch 504. The concatenation 512 of lane line segmentation as an additional channel to the camera channel allows the 3D-CNN 510 to focus on the apparent displacement of the lane line segments in the video sequences to best estimate the ego-vehicle speed.

Referring back to FIG. 6, the architecture 504 for lane line segmentation includes an encoder 614 and a decoder 618. The backbone network 614 is used to extract the features of the input image 612. Typically, some classic image classification network serves as the backbone. In one embodiment, CSP Darknet is used as the backbone. The SPP 616 generates and fuses features of different scales.

The lane line segmentation head 618 is configured such that after three upsampling processes, an output feature map 622 is restored to the size of (W; H; 2), which represents the probability of each pixel in the input image 612 for the lane line and the background.

In some embodiments, other road features may be used in the segmentation for masked attention. Other road features can include, but are not limited to, periodic reflectors marking road boundaries, road center rumble ridges, road barriers having reflective markings, and mile marker posts.

In some embodiments, the background is used to classify a road condition. Road conditions can include wet road, dry road, icy road, or snow conditions, to name a few. In some embodiments, the background can be used to classify the type of road, including paved road vs an unfinished road.

In some embodiments, multiple branches may be used in addition to lane line segmentation branch 504 for determining masked attention maps. Each of the multiple branches may be for each of the different types of road features that can be used to focus attention for speed estimation.

The 3D-CNN architecture with masked-attention (3D-CMA) for ego vehicle speed estimation is illustrated in FIG. 5.

In the 3D-CNN architecture of FIG. 5, the RGB stream can be converted to grayscale since color information is not vital for speed estimation. However, a masked attention map 406 is concatenated 512 as an additional channel to the grayscale image 502. To reduce the computational complexity and memory requirement, the original input streams are resized to 64×64 before feeding them into the network 510. Thus, the input to the model has a dimension of n×64×64×2, where n is the number of frames in the temporal sequence.

In one embodiment, all convolutional 3D layers 516, 522 use a fixed kernel size of 3×3×3. The initial pooling layer 518 uses a kernel size of 1×2×2 to preserve the temporal information. The subsequent pooling layer 524, which appears at the center of the network, compresses the temporal and spatial domains with a kernel size of 2×2×2. Six 3D convolutional layers 516, 522, 526, 528 are incorporated with the number of filters for the layers from 1-6 being 32; 32; 64; 64; 128; 128 respectively. Finally, four fully connected layers 532, 434, 436, 438 have 512; 256; 64 and 1 nodes.

The L2 loss function which is used for training the 3D-CNN is as follows:

$$\mathcal{L}_{speed} = \frac{1}{n}\sum_{i=0}^{n}(S_i - \hat{S}_i)^2$$

$$= \frac{1}{n}\sum_{i=0}^{n}(S_i - W^T X)$$

$$= \frac{1}{n}\sum_{i=0}^{n}(S_i - W^T(X_I + X_M))^2$$

where n is the number of frames in the input and Si is the speed value ground truth of ith corresponding frame, and Si is the inferred speed value. Xi is the grayscale image channel, and $X_M$ is the masked-attention channel for every frame. W is the weight tensor of the 3D convolutional kernel.

The ego vehicle speed estimation may encounter varying conditions, such as varying road markings, varying road conditions, and even varying road surface types. The ego vehicle speed estimation can be configured to go into power conserve modes depending on such varying conditions. In some embodiments, the onboard hardware implementation of an ego vehicle speed estimation system 400 may be configured to use power efficiently. The hardware implementation 400 can be configured to halt processing of the 3D-CNN network when the segmented features do not include road features that may be used to determine ego vehicle speed. The hardware implementation 400 can be configured to monitor ego vehicle speed obtained from internal sensors while the 3D-CNN network is in the halted state. The hardware implementation 400 can be configured to intermittently perform processing using the 3D-CNN network. The hardware implementation 400 can be configured to continuously monitor vehicle speed while the ego vehicle is in an operating state and periodically estimate speed of the ego vehicle using the 3D-CNN network.

The effectiveness of the 3D-CMA model was evaluated. First, the public datasets used in experiments are described. Then the metrics used for evaluation are described. The 3D-CMA model architecture is compared against a ViViT, a state-of-the-art vision transformer architectures. Additionally, some ablation studies are described to characterize the contribution of masked-attention within the network architecture and compare its performance by discarding the same from the 3D-CNN.

A Video Vision Transformer(ViViT) is used for some cases due to its representation of the 3D convolution in the form of Tubelet embedding. See Anurag Arnab, Mostafa Dehghani, Georg Heigold, Chen Sun, Mario Luc̆'ic', and Cordelia Schmid. Vivit: A video vision transformer. In *Proceedings of the IEEE/CVF International Conference on Computer Vision*, pages 6836-6846, 2021, incorporated herein by reference in its entirety. ViViT is easily reproducible and has a good balance between the parameters and accuracy for small datasets. Moreover, ViViT-H scores an accuracy of 95.8, just below the 95.9 accuracy score by Swin-L as per the Video Transformers Survey over HowTo100M. See Javier Selva, Anders S Johansen, Sergio Escalera, Kamal Nasrollahi, Thomas B Moeslund, and Albert Clapés. Video transformers: A survey. arXiv preprint arXiv:2201.05991, 2022; and Antoine Miech, Dimitri Zhukov, Jean-Baptiste Alayrac, Makarand Tapaswi, Ivan Laptev, and Josef Sivic. Howto100m: Learning a text-video embedding by watching hundred million narrated video clips. In *Proceedings of the IEEE/CVF International Conference on Computer Vision*, pages 2630-2640, 2019, each incorporated herein by reference in their entirety.

Figure 7:
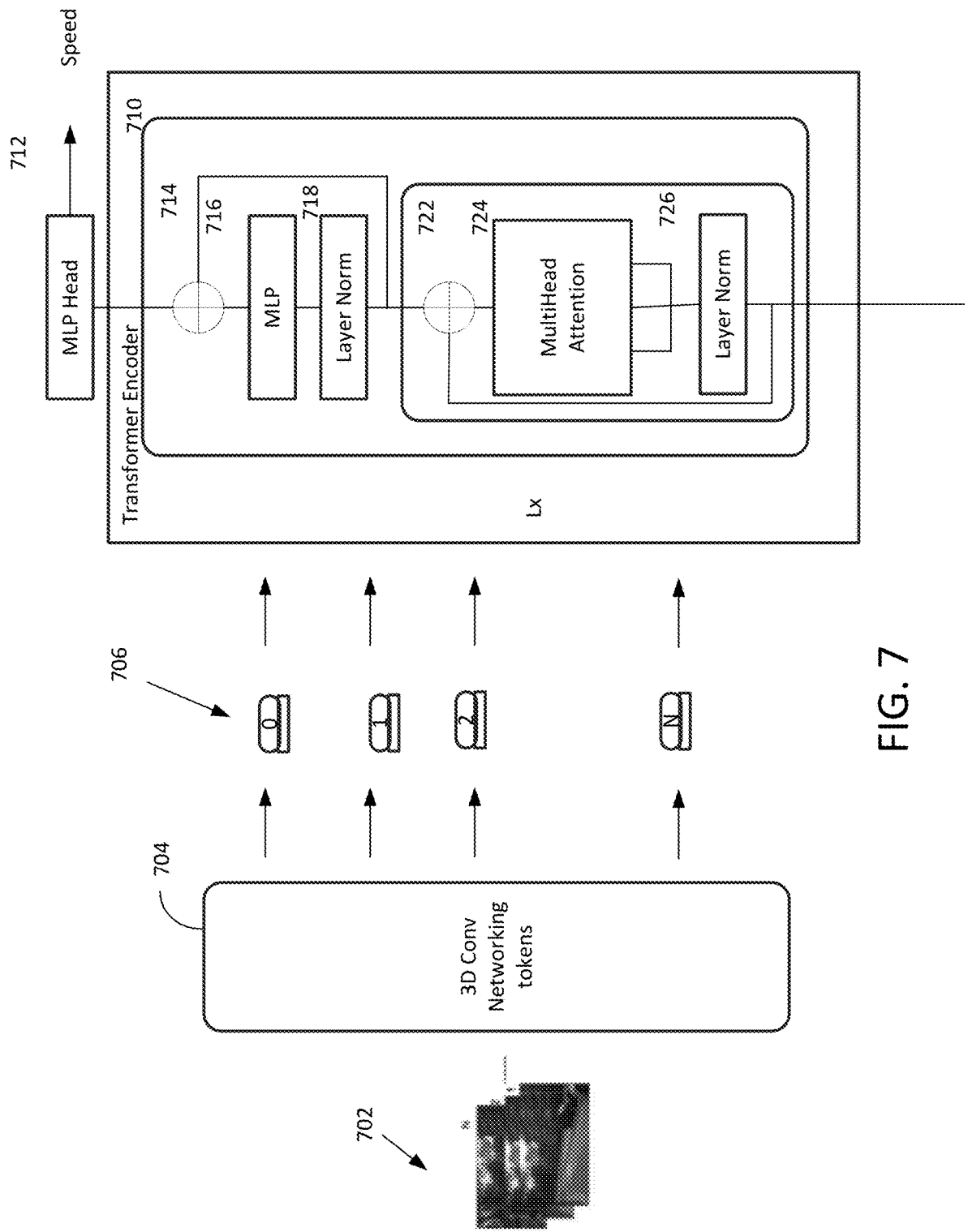
FIG. 7 is a block diagram of an architecture of ViViT.
Figure 8A:
FIGS. 8A-8D illustrate visualization of sample images of the KITTI and nuImages dataset.
Figure 8B:
Figure 8C:
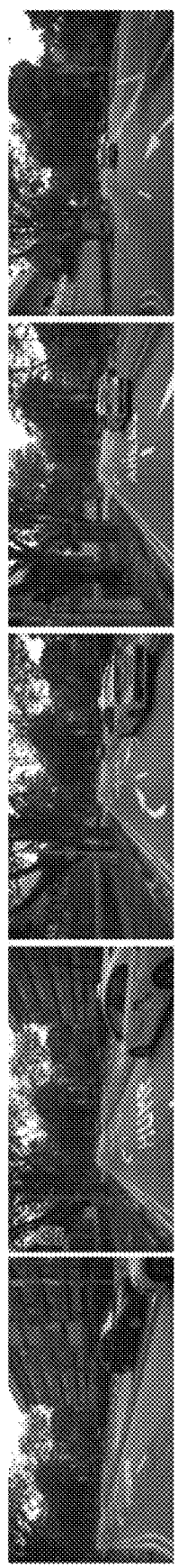
Figure 8D:
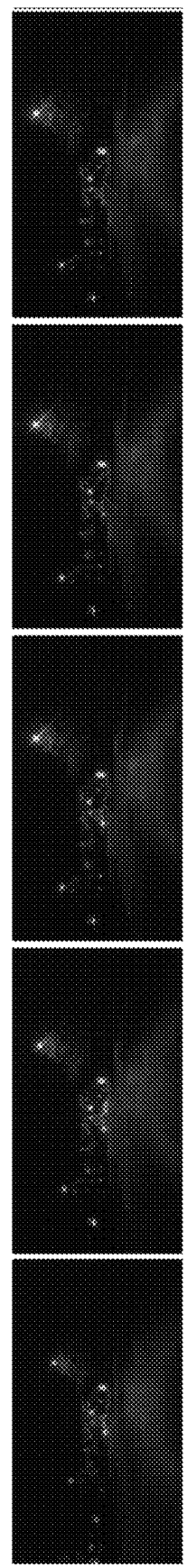
Figure 9A:
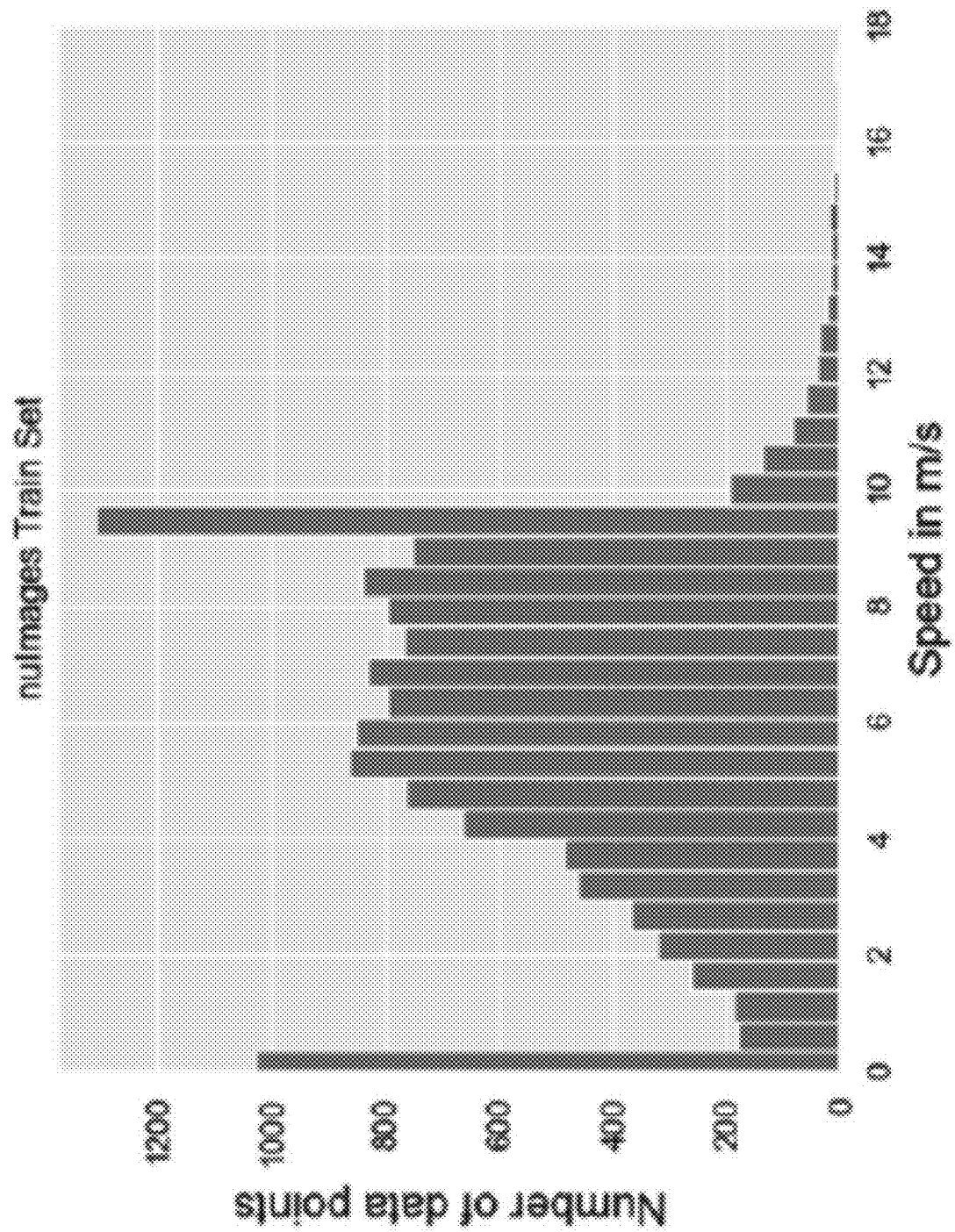
FIGS. 9A-9D are graphs of train/test speed data distribution for nuImages and KITTI datasets.
Figure 9B:
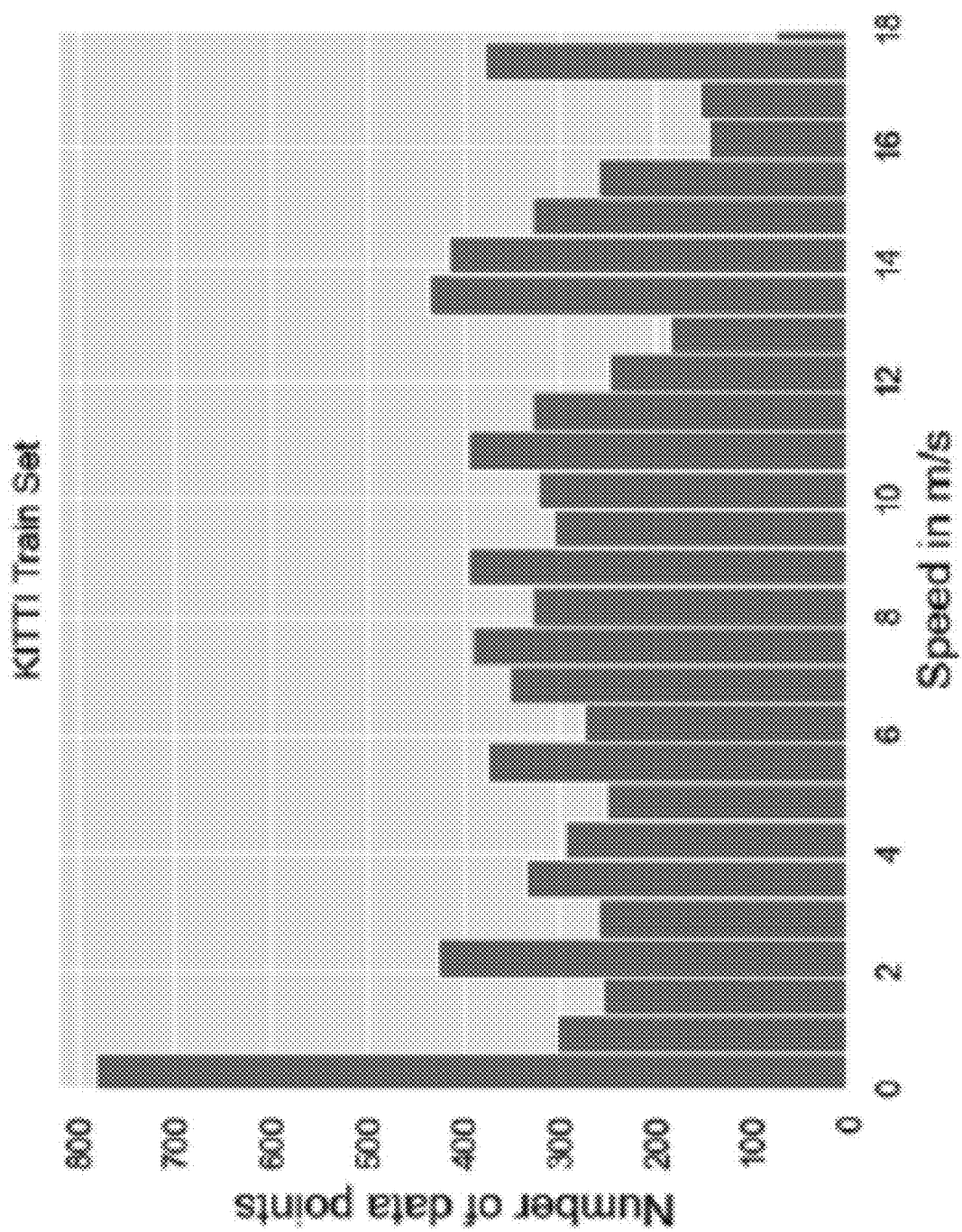
Figure 9C:
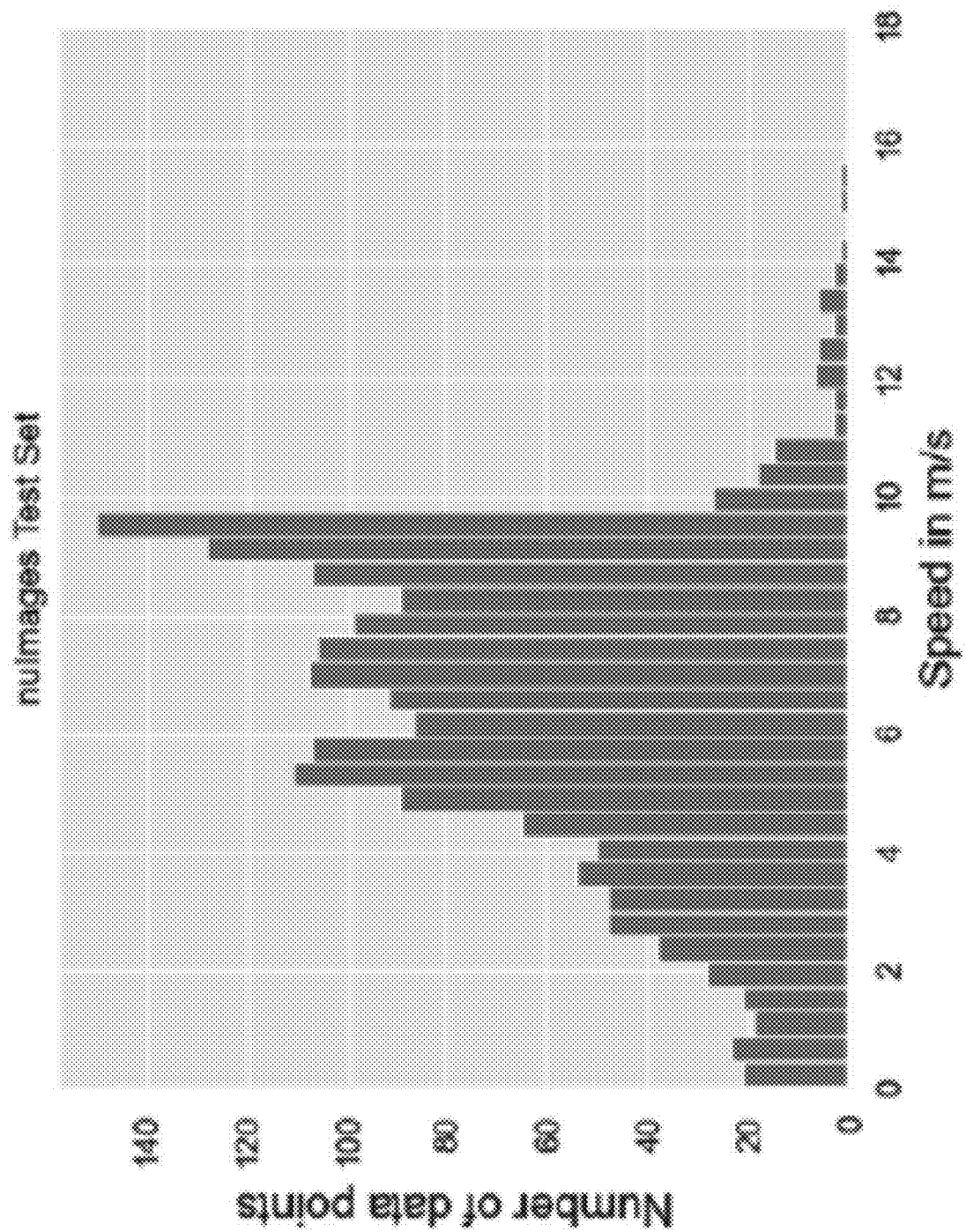
Figure 9D:
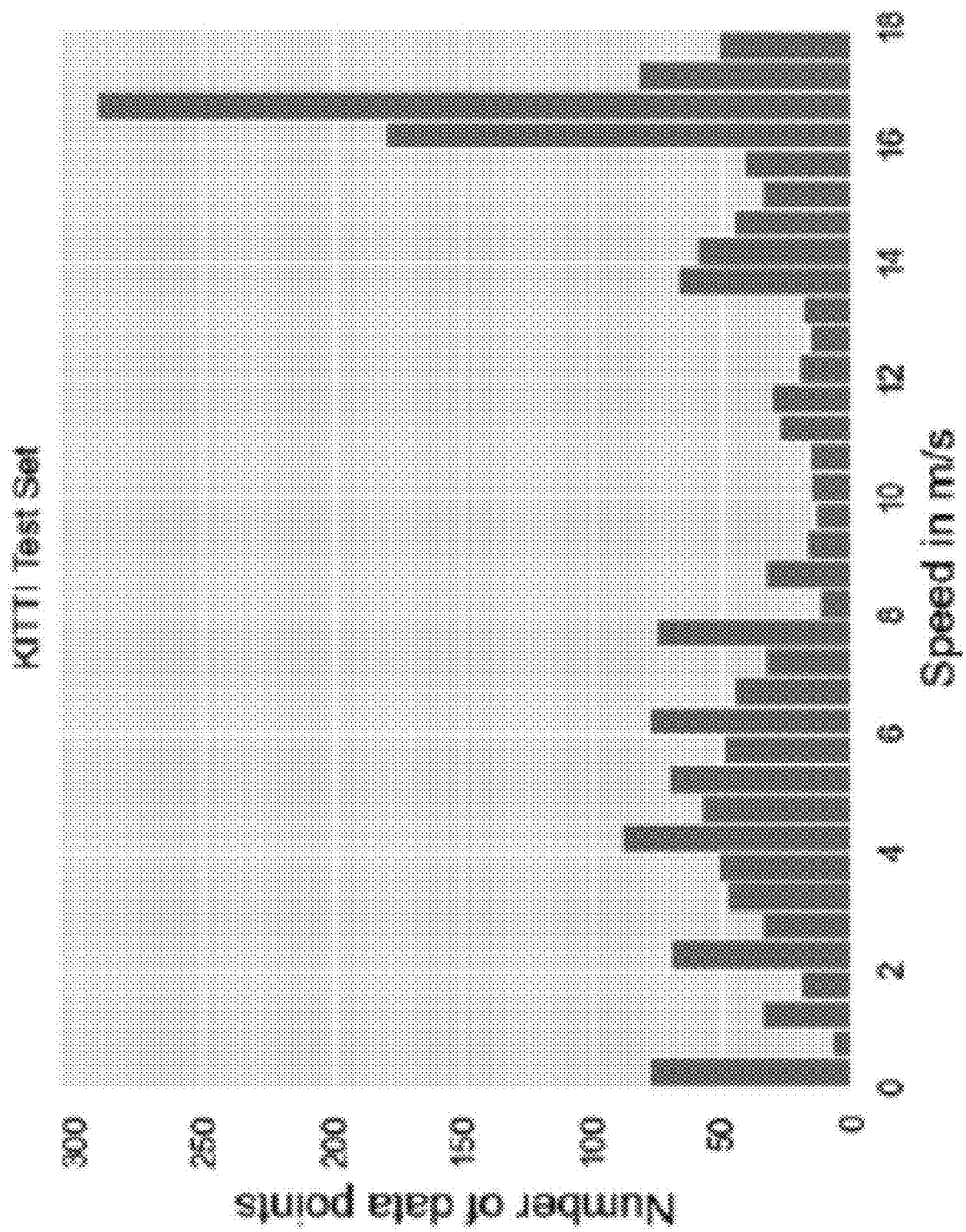

FIG. 7 is a block diagram of an architecture of ViViT. In the ViViT, the frames from the video(N) are tokenized using 3D-Convolutional tubelet embeddings and further passed to multiple transformer encoders to regress the speed value finally.

The ViViT includes extracting non-overlapping, spatio-temporal "tubes" from the input volume, and to linearly project this to $\mathbb{R}^d$. This method is an extension of ViT's embedding to 3D, and corresponds to a 3D convolution. For a tubelet of dimension $$t \times h \times w, n_t = \left[\frac{T}{t}\right], n_h = \left[\frac{H}{h}\right] \text{ and } n_w = \left[\frac{W}{w}\right],$$

tokens are extracted from temporal, height, and width dimensions respectively. Smaller tubelet dimensions thus result in more tokens which increases the computation.

A ViT extracts N non-overlapping image patches, $x_i \in \mathbb{R}^{h \times w}$, 602 performs a linear projection and then rasterises them into 1D tokens $z_i \in \mathbb{R}^d$. The sequence of tokens input to the following transformer encoder is $$Z=[z_{cls}, Ex1, Ex2, \ldots, Ex_N]+p$$

where the projection by E is equivalent to a 2D convolution.

As shown in FIG. 7, an optional learned classification token $z_{cls}$ 704 is prepended to this sequence, and its representation at the final layer of the encoder serves as the final representation used by the classification layer. In addition, a learned positional embedding, $p \in \mathbb{R}^{N \times d}$ 706, is added to the tokens to retain positional information, as the subsequent self-attention operations in the transformer are permutation invariant. The tokens are then passed through an encoder consisting of a sequence of L transformer layers 710. Each layer 1 comprises of Multi-Headed Self-Attention 724, layer normalisation (LN) 618, 626, and MLP blocks 716.

The Transformer Encoder can be trained with the spatio-temporal embeddings.

There is a lack of standardized datasets available for the estimation of ego-vehicle speed from a monocular camera stream. DBNet is a large-scale dataset for driving behavior research which includes aligned videos and vehicular speed from 1000 km driving stretch. See Yiping Chen, Jingkang Wang, Jonathan Li, Cewu Lu, Zhipeng Luo, Han Xue, and Cheng Wang. Lidar-video driving dataset: Learning driving policies effectively. In 2018 *IEEE/CVF Conference on Computer Vision and Pattern Recognition*, pages 5870-5878, 2018, incorporated herein by reference in its entirety. However, the test set is not available for public usage. Likewise, the test set of comma.ai speed challenge is not open to the public. See comma.ai speed challenge, 2018, incorporated herein by reference in its entirety. KITTI dataset has been utilized for speed estimation using motion and monocular depth estimation. See Róbert-Adrian Rill. Speed estimation evaluation on the kitti benchmark based on motion and monocular depth information, 2019, incorporated herein by reference in its entirety. However, there is no information about the train and test splits used for the evaluation of the models. In the present disclosure, two public datasets are utilized for experiments—nuImages and KITTI. Some sample images extracted from video sequences for nuImages and KITTI are shown in FIGS. 7A-7D.

nuImages is derived from nuScenes and is a large-scale autonomous driving dataset having 93 k video clips of 6 seconds each. See Holger Caesar, Varun Bankiti, Alex H. Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving. In CVPR, 2020, incorporated herein by reference in its entirety. The dataset is collated from two diverse cities—Boston and Singapore. Each video clip consists of 13 frames spaced out at 2 Hz. The annotated images include rain, snow, and night time, which are important for autonomous driving applications.

Each sample in the nuImages dataset comprises of an annotated camera image with an associated timestamp and past and future images. It is to be noted that the six previous and six future images are not annotated. The sample frame has meta-data information available as token ids regarding the previous and future frames associated with the particular sample.

The vehicle speed is extracted from the CAN bus data and linked to the sample data through sample tokens. The train and test splits of the nuImages dataset have been strictly followed for training and evaluating the AI models. The distribution of speed data across train and test splits of the nuImages dataset are shown in FIGS. 8A-8D.

The KITTI Vision Benchmark Suite is a public dataset containing raw data recordings that are captured and synchronized at 10 Hz. See Andreas Geiger, Philip Lenz, and Raquel Urtasun. Are we ready for autonomous driving? the kitti vision benchmark suite. In 2012 *IEEE Conference on Computer Vision and Pattern Recognition*, pages 3354-3361, 2012; and A Geiger, P Lenz, C Stiller, and R Urtasun. Vision meets robotics: The kitti dataset. *The International Journal of Robotics Research*, 32(11):1231-1237, 2013, each incorporated herein by reference in their entirety. Geiger et al., 2012, presented the benchmark challenges, their creation and use for evaluating state-of-the-art computer vision methods, while Geiger et al., 2013, was a follow-up work that provided technical details on the raw data itself, describing the recording platform, the data format and the utilities.

The dataset was captured by driving around the mid-size city of Karlsruhe. The "synched+rectified" processed data is utilized where images are rectified and undistorted and where the data frame numbers correspond across all sensor streams. While the dataset provides both grayscale and color stereo sequences, an RGB stream is utilized extracted from camera ID 03 only. The ego-vehicle speed values are extracted from IMU sensor readings. The raw data is split across six categories—City, Residential, Road, Campus, Person, and Calibration. For an experiment, data from City and Road categories is utilized. Some video samples in the City category have prolonged periods where the car is stationary. Such video samples are discarded where the vehicle was stationary for most of the video samples. To facilitate future benchmarks from the research community for ego-vehicle speed estimation, train and test splits are reported in Table 1. The distribution of speed data across train and test splits from the KITTI dataset is shown in FIGS. 9A-9D.

TABLE 1 train and test video samples for KITTI dataset

| KITTI Category | Train | | Test |
|---|---|---|---|
| City | 2011_09_26_drive | 0002, 0005, 0009 | 0001 |
| | | 0011, 0013, 0014 | 0117 |
| | | 0048, 0051, 0056 | |
| | | 0059, 0084, 0091 | |
| | | 0095, 0096, 0104 | |
| | | 0106, 0113 | |
| | 2011_09_28_drive | 0001 | |
| | 2011_09_29_drive | 0071 | |
| Road | 2011_09_26_drive | 015, 0027, 0028 | 0070 |
| | | 0029, 0032, 0052 | 0101 |
| | 2011_09_29_drive | 0004, 0016, 0042 | |
| | | 0047 | |

The conventional evaluation protocol used in the literature for the task of regression—Mean Absolute Error (MAE) and Root Mean Square Error (RMSE)—was used.

The MAE and RMSE are computed as follows:

$$RMSE = \sqrt{\left(\frac{1}{n}\right)\sum_{i=1}^{n}(y_i - \hat{y}_i)^2}$$

$$MAE = \left(\frac{1}{n}\right)\sum_{i=1}^{n}|\hat{y}_i - y_i|$$

where $y_i$ denotes the ground truth ego-vehicle speed value and $\hat{y}_i$ denotes the predicted speed value by the AI model.

RGB images from the camera mounted in front of the vehicle are used and ego-vehicle velocity coming from the CAN-BUS across both public datasets. This information is synchronized. The KITTI dataset has a camera image resolution of 1238_374. The temporal dimension we used for the KITTI dataset is ten frames. The KITTI dataset is sampled at 10 Hz, which means that the models are fed with video frames containing visual information from a time window of 1 sec. The ego-vehicle velocity assigned to any temporal sequence is the speed value tagged to the closest time stamp of the 10th frame in the input sequence.

On the other hand, the camera image resolution for the nuImages dataset is 1600_900. nuImages dataset is sampled at 2 Hz. Six frames each are taken, preceding and succeeding the sample frame. This means that the models are fed with video frames containing visual information spanning a time window of approximately 6 sec. The ego vehicle velocity assigned to any temporal sequence is the speed value tagged to the closest time-stamp of the sample frame (7th frame in the input sequence).

For the experiments with ViViT, non-overlapping, spatio-temporal tubelet embeddings of dimension t×h×w are taken, where t=6, h=8, and w=8. The number of transformer layers in the implementation is 16. The number of heads for multi-headed self-attention blocks is 16, and the dimension of embeddings is 128.

The AI models were trained using an Nvidia GeForce RTX-3070 Max-Q Design GPU having 8 GB VRAM. The learning rate used for training all models is $1\times10^{-3}$. All models are trained for 100 epochs with early stopping criteria set to terminate the training process if validation loss does not improve for ten epochs consecutively. The optimizer utilized is Adam since it utilizes both momentum and scaling The performance of the proposed 3D-CMA architecture is evaluated and compared against the standard ViViT with spatio-temporal attention. The evaluation metrics are reported on the test set for KITTI and nuImages datasets in the subsections below. The evaluation across all datasets consistently reported better results for the 3D-CMA architecture.

Evaluation scores for the nuImages dataset are shown in Table 2. Approximately 27% improvement was observed in RMSE and MAE for 3D-CMA compared to ViViT for the nuImages dataset.

TABLE 2 nuImages evaluation for (a) ViViT (b)3DCMA
Evaluation Metric

| Method | RMSE | MAE |
|---|---|---|
| VIViT | 1.782 | 1.326 |
| 3D CMA | 1.297 | 0.974 |

The evaluation shows 34:5% and 41:5% improvement in RMSE and MAE respectively on the KITTI dataset for 3D-CMA compared to ViViT. The results are seen in Table 3.

TABLE 3

Evaluation on KITTI dataset for (a) ViViT (b)3D-CMA
Evaluation Metric

| Method | RMSE | MAE |
|---|---|---|
| VIViT | 5.024 | 4.324 |
| 3D CMA | 3.290 | 2.528 |

To further understand the importance of masked-attention, an ablation study was conducted by removing masked attention input to the 3D-CNN network. It is to be noted that the input to the 3D-CNN model is a single-channel grayscale image after the removal of the masked-attention input.

Evaluation scores for the nuImages dataset are shown in Table 4. The addition of masked-attention reduces RMSE by 23:6% and MAE by 25:9% for the nuImages dataset.

TABLE 4

Evaluation on nuImages dataset for (a)3D-CNN
without masked-attention (b)3D-CMA
Evaluation Metric

| Method | RMSE | MAE |
|---|---|---|
| 3D-CNN without MA | 1.698 | 1.315 |
| 3D CMA | 1.297 | 0.974 |

Evaluation scores for the KITTI dataset are shown in Table 5. The addition of masked-attention reduces the RMSE by 25:8% and MAE by 30:1% for the KITTI dataset.

TABLE 5

Evaluation on KITTI dataset for (a)3D-CNN
without masked-attention (b)3D-CMA
Evaluation Metric

| Method | RMSE | MAE |
|---|---|---|
| 3D-CNN without MA | 4.437 | 3.617 |
| 3D CMA | 3.290 | 2.528 |

To take into consideration the generalization ability of the AI models, evaluations were conducted across data sets and their accuracy was reported. It is to be noted that there is a shift in the domain when testing nuImages-trained AI models on the KITTI dataset due to the reasons stated in section 4.3. To test KITTI models on the nuImages dataset, ten frames are needed within a duration of 1 second from nuImages. Since the FPS of the nuImages dataset is only 2 FPS, evaluation was unable to encapsulate ten frames within a temporal window of 1 sec. For this reason, testing discarded KITTI models on the nuImages dataset. The KITTI video stream was pre-processed to evaluate nuImages-trained models on the KITTI dataset to ensure the temporal windows are compatible. nuImages-trained models require the temporal window to be 13 frames across 6 secs. However, KITTI dataset video streams are sampled at 10 Hz. The frame decimation was used to sample the video at 2 Hz and concatenate frames across 6 secs of the stream to encapsulate the 13 frames temporal window. The images were resized and were allowed the mismatch in the image dimensions between the two datasets to diversify the gap between them in the evaluation. The results for two models are reported below in Table 6.

TABLE 6

Evaluation of nuImages trained models on
KITTI test data for (a) ViViT (b) 3D-CMA
Evaluation Metric

| Method | RMSE (KITTI) | MAE (KITTI) |
|---|---|---|
| ViViT (nuImages) | 7.420 | 5.957 |
| 3D CMA (nuImages) | 5.880 | 4.694 |

The present disclosure includes a modified 3D-CNN architecture with masked-attention employed for ego vehicle speed estimation using single-camera video streams. 3D-CNN is effective in capturing temporal elements within an image sequence. However, it was determined that presence of background clutter and non-cohesive motion within the video stream often confused the model. To extend some control over the focus regions within the images, the 3D-CNN is modified to employ a masked-attention mechanism to steer the model to focus on relevant regions. In one embodiment, the lane segmentation mask is concatenated as an additional channel to the input images before feeding them to the 3D-CNN. The modified 3D-CNN has demonstrated better performance in several evaluations with the inclusion of the masked-attention.

The performance of the modified 3D-CNN architecture was evaluated on two publicly available datasets—nuImages and KITTI. Though there are prior works utilizing the KITTI dataset for the ego vehicle speed estimation task, none clearly stated the train and test splits being used for reporting the results. In the present disclosure, the train and test splits from KITTI Road and City categories are reported.

In terms of evaluation, the 3D-CMA is compared against a recent state-of-the-art transformer network for videos, ViViT. In addition, the impact of employing masked-attention to 3D-CNN is investigated and the injection of masked-attention improved the MAE and RMSE scores across all scenarios. The increase in the RMSE and MAE scores for cross-dataset evaluation is due to the domain gap between the two datasets. However, 3D-CMA continued to perform better for the cross-data set evaluation as well.

Next, further details of the hardware description of an exemplary computing environment according to embodiments is described with reference to FIG. 10.

Figure 10:
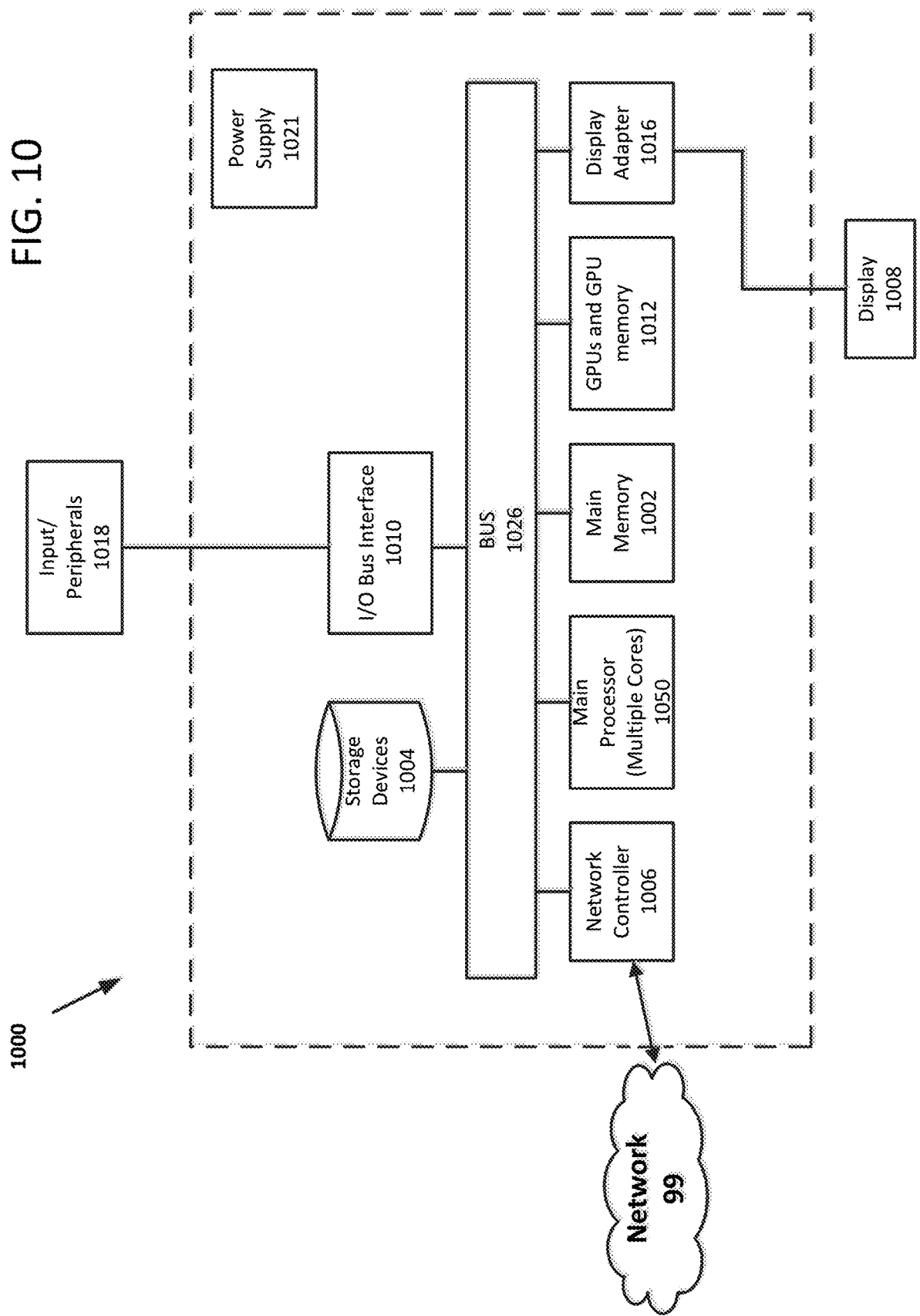
FIG. 10 is an illustration of a non-limiting example of details of computing hardware used in the computing system, according to aspects of the present disclosure.

In FIG. 10, a controller 1000 is a computing device which includes a CPU 1050 which can perform the processes described above.

The computing device may be an AI workstation running an operating system, for example Ubuntu Linux OS, Windows, a version of Unix OS, or Mac OS. The computer system 1000 may include one or more central processing units (CPU) 1050 having multiple cores. The computer system 1000 may include a graphics board 1012 having multiple GPUs, each GPU having GPU memory. The graphics board 1012 may perform many of the mathematical operations of the disclosed machine learning methods. The computer system 1000 includes main memory 1002, typically random access memory RAM, which contains the software being executed by the processing cores 1050 and GPUs 1012, as well as a non-volatile storage device 1004 for storing data and the software programs. Several interfaces for interacting with the computer system 1000 may be provided, including an I/O Bus Interface 1010, Input/Peripherals 1018 such as a keyboard, touch pad, mouse, Display Adapter 1016 and one or more Displays 1008, and a Network Controller 1006 to enable wired or wireless communication through a network 99. The interfaces, memory and processors may communicate over the system bus 1026. The computer system 1000 includes a power supply 1021, which may be a redundant power supply.

In some embodiments, the computer system 1000 may include a server CPU and a graphics card by NVIDIA, in which the GPUs have multiple CUDA cores. In some embodiments, the computer system 1000 may include a machine learning engine 1012.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
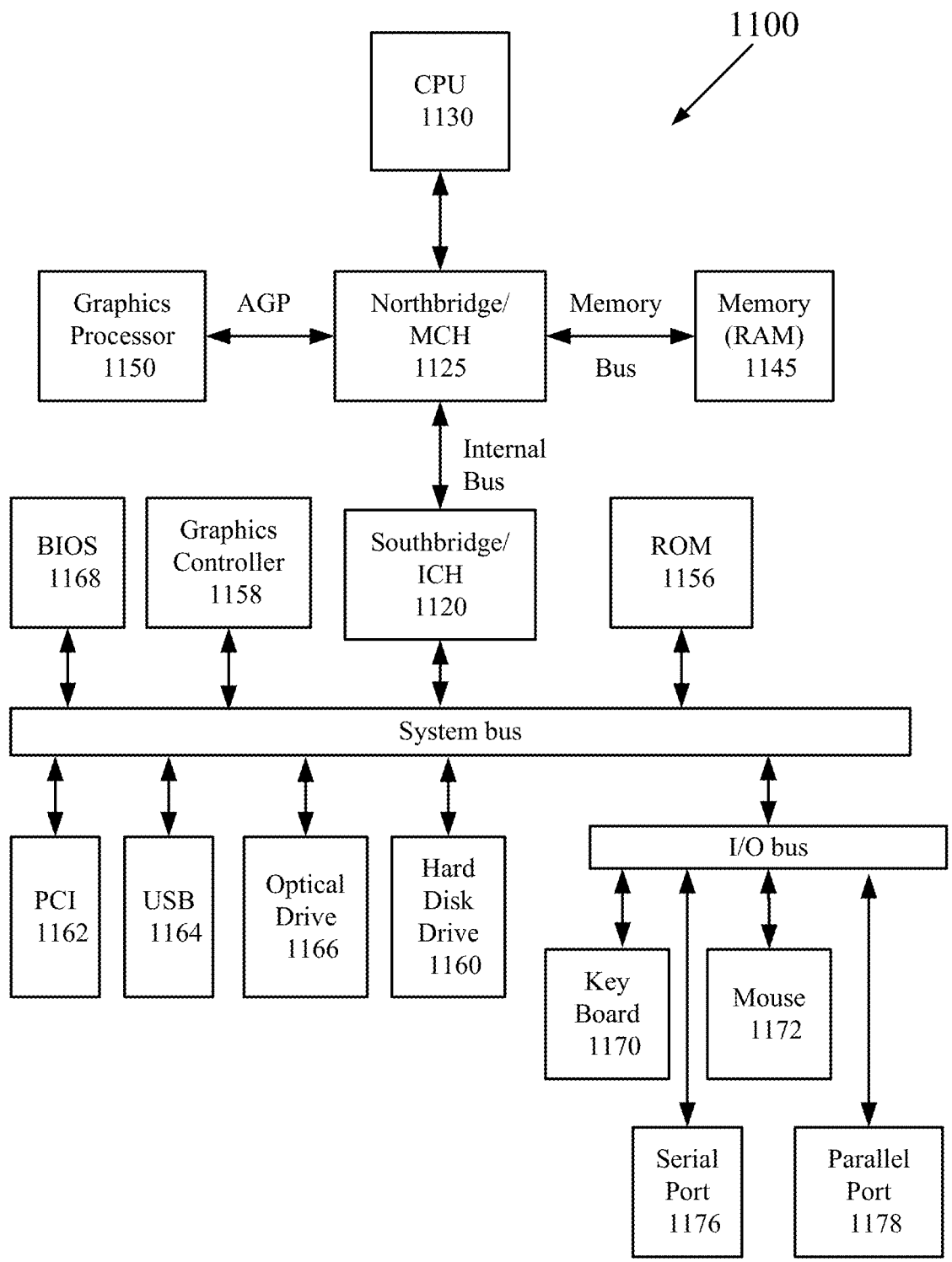
FIG. 11 is an exemplary schematic diagram of a data processing system used within the computing system, according to aspects of the present disclosure.

FIG. 11 shows a schematic diagram of a data processing system 1100 used within the computing system, according to exemplary aspects of the present disclosure. The data processing system 1100 is an example of a computer in which code or instructions implementing the processes of the illustrative aspects of the present disclosure may be located.

In FIG. 11, data processing system 1180 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
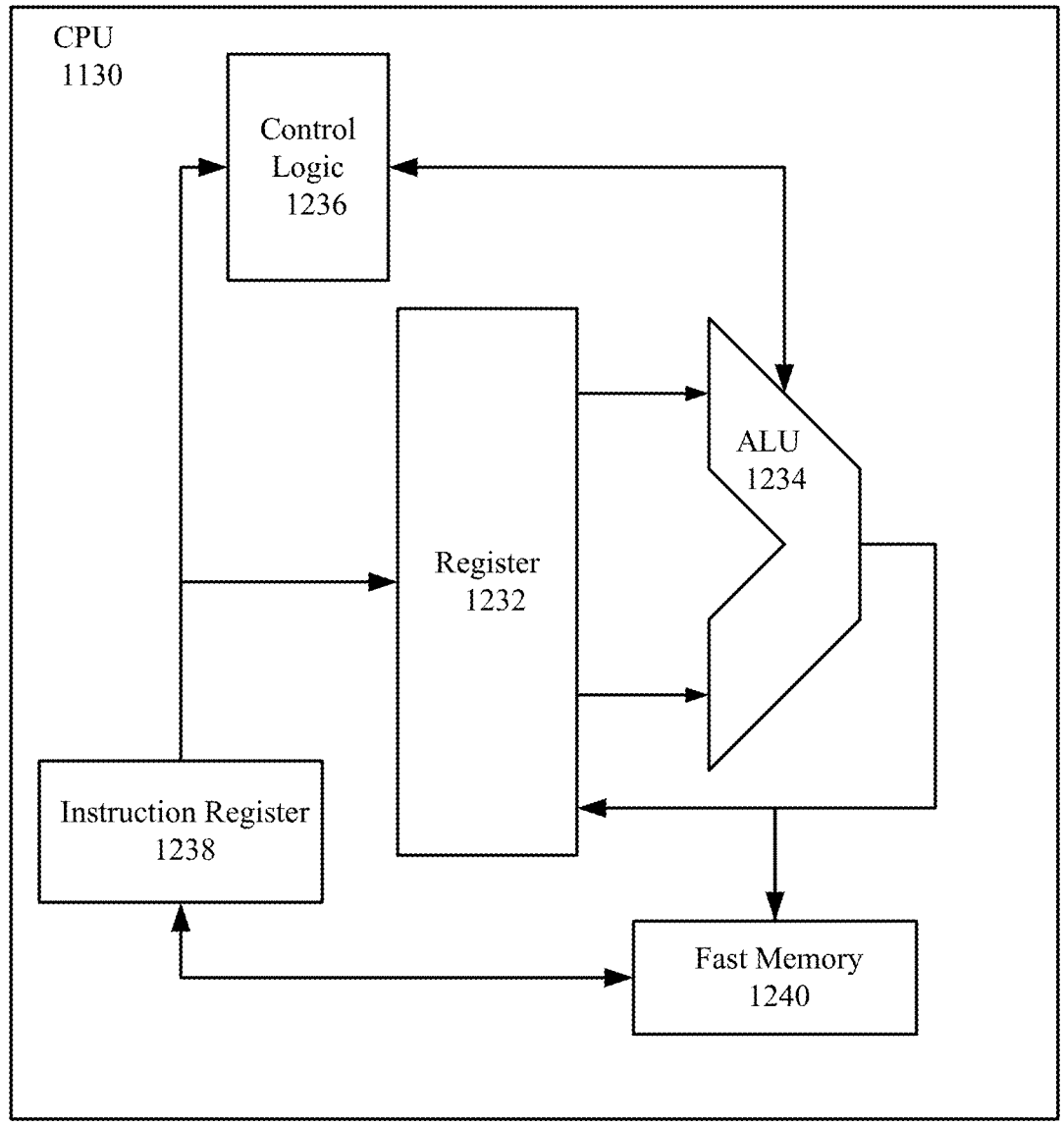
FIG. 12 is an exemplary schematic diagram of a processor used with the computing system, according to aspects of the present disclosure.

For example, FIG. 12 shows one aspects of the present disclosure of CPU 1130. In one aspects of the present disclosure, the instruction register 1238 retrieves instructions from the fast memory 1240. At least part of these instructions is fetched from the instruction register 1238 by the control logic 1236 and interpreted according to the instruction set architecture of the CPU 1130. Part of the instructions can also be directed to the register 1232. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1180 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
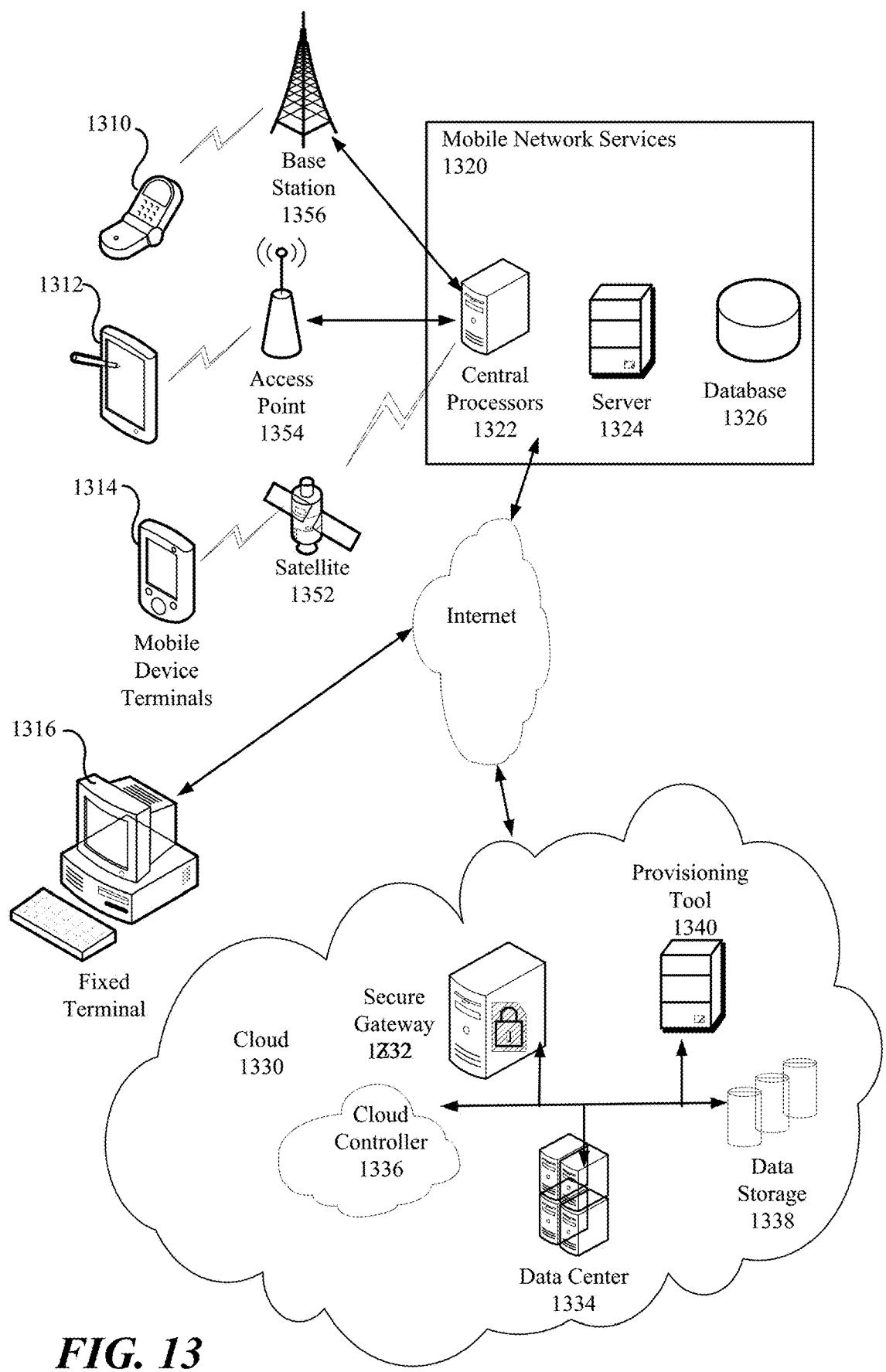
FIG. 13 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). More specifically, FIG. 13 illustrates client devices including smart phone 1311, tablet 1312, mobile device terminal 1314 and fixed terminals 1316. These client devices may be commutatively coupled with a mobile network service 1320 via base station 1356, access point 1354, satellite 1352 or via an internet connection. Mobile network service 1320 may comprise central processors 1322, server 1324 and database 1326. Fixed terminals 1316 and mobile network service 1320 may be commutatively coupled via an internet connection to functions in cloud 1330 that may comprise security gateway 1332, data center 1334, cloud controller 1336, data storage 1338 and provisioning tool 1340. The network may be a private network, such as a LAN or WAN, or may be a public network, such as the Internet. Input to the system may be received via direct user input and received remotely either in real-time or as a batch process. Additionally, some aspects of the present disclosure may be performed on modules or hardware not identical to those described.

Numerous modifications and variations of the present invention are possible in light of the above teachings. It is therefore to be understood that within the scope of the appended claims, the invention may be practiced otherwise than as specifically described herein. As an example, the invention may be practiced to utilize the speed of ego vehicle to estimate the speeds and locations of environment vehicles for in-vehicle motion and path planning.

The invention claimed is:

1. A system for ego vehicle speed estimation, comprising
a car-mounted monocular camera for capturing a sequence of video frames of an outdoor scene from a moving car, where the outdoor scene includes a road, as a camera channel;
processing circuitry configured with
a single-shot network, and
a neural network time series model,
wherein the single-shot network segments features of the road in the video frame sequence and generates a masked-attention map for the segmented road features;
a concatenation operation that concatenates the masked-attention map as an additional channel to the camera channel to generate a masked-attention input;
wherein the neural network time series model receives the masked-attention input and generates an estimated speed of the ego vehicle based on displacement of the segmented road features in the video sequences; and
output circuitry to output a signal indicating the estimated speed.

2. The system of claim 1, wherein the processing circuitry is configured with a grayscale conversion circuit to convert RGB of the video frame sequence to a grayscale video frame sequence.

3. The system of claim 1, wherein the single-shot network is a lane line segmentation network to segment lane line segments as the road features.

4. The system of claim 3, wherein the single-shot network includes a Spatial Pyramid Pooling component and a Feature Pyramid Network component to obtain features of the video frame sequence containing multiple scales and multiple semantic level information.

5. The system of claim 1, wherein the single-shot network contains a shared encoder and three separate decoders that accomplish specific tasks of object detection, drivable area segmentation and lane line segmentation.

6. The system of claim 1, wherein the processing circuitry halts processing of the neural network time series model while the segmented features do not include predetermined road features.

7. The system of claim 1, wherein the neural network time series model is a 3D convolutional neural network (3D-CNN), and
wherein the 3D-CNN receives the masked-attention input and generates an estimated speed of the ego vehicle based on displacement of the segmented road features in the video sequences.

8. The system of claim 1, wherein the processing circuitry intermittently performs processing using the neural network time series model.

9. The system of claim 1, wherein the processing circuitry continuously monitors vehicle speed while the ego vehicle is in an operating state and periodically estimates speed of the ego vehicle using the neural network time series model.

10. An embedded ego vehicle speed estimation apparatus, comprising:
processing circuitry configured with
a single-shot network and a neural network time series model,
wherein the single-shot network segments features in a video frame sequence of a road and generates a masked-attention map for the segmented road features;
a concatenation operation that concatenates the masked-attention map as an additional channel to a camera channel to generate a masked-attention input;
wherein the neural network time series model receives the masked-attention input and generates an estimated speed of the ego vehicle based on displacement of lane line segments in the video sequences; and
output circuitry to output a signal indicating the estimated speed.

11. The apparatus of claim 10, wherein the processing circuitry is configured with a grayscale conversion circuit to convert RGB of the video frame sequence to a grayscale video frame sequence.

12. The apparatus of claim 10, wherein the single-shot network is a lane line segmentation network to segment the lane line segments as the road features.

13. The apparatus of claim 12, wherein the single-shot network includes a Spatial Pyramid Pooling component and a Feature Pyramid Network component to obtain features of the video frame sequence containing multiple scales and multiple semantic level information.

14. The apparatus of claim 10, wherein the single-shot network contains a shared encoder and three separate decoders that accomplish specific tasks of object detection, drivable area segmentation and lane line segmentation.

15. The apparatus of claim 10, wherein the processing circuitry halts processing of the neural network time series model while the segmented features do not include predetermined road features.

16. The apparatus of claim 15, wherein the neural network time series model is a 3D convolutional neural network (3D-CNN), and
wherein the 3D-CNN receives the masked-attention input and generates an estimated speed of the ego vehicle based on displacement of the segmented road features in the video sequences.

17. The apparatus of claim 10, wherein the processing circuitry intermittently performs processing using the neural network time series model.

18. The apparatus of claim 10, wherein the processing circuitry, continuously monitors vehicle speed while the ego vehicle is in an operating state and periodically estimates speed of the ego vehicle using the neural network time series model.

19. A non-transitory computer readable storage medium storing computer instructions, which when executed by processing circuitry, perform a method of ego vehicle speed estimation comprising:
segmenting, by a single-shot network, features in a video frame sequence of a road and generates a masked-attention map for the segmented road features;
concatenating, by a concatenation operation, the masked-attention map as an additional channel to a camera channel to generate a masked-attention input;
receiving, by a neural network time series model, the masked-attention input and generating an estimated speed of the ego vehicle based on displacement of lane line segments in the video sequences; and
outputting a signal indicating the estimated speed.

20. The storage medium of claim 19, further comprising, segmenting, by the single-shot network, the lane line segments as the road features.

* * * * *